United States Patent
Wiberg et al.

(10) Patent No.: US 10,256,883 B2
(45) Date of Patent: Apr. 9, 2019

(54) REFERENCE SIGNAL REPORTING IN A WIRELESS COMMUNICATION SYSTEM

(71) Applicant: Telefonaktiebolaget LM Ericsson (publ), Stockholm (SE)

(72) Inventors: Niclas Wiberg, Linköping (SE); Håkan Andersson, Linköping (SE); Mattias Frenne, Uppsala (SE); Johan Furuskog, Stockholm (SE); Johan Kåredal, Lund (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/555,263

(22) PCT Filed: May 24, 2017

(86) PCT No.: PCT/SE2017/050559
§ 371 (c)(1),
(2) Date: Sep. 1, 2017

(87) PCT Pub. No.: WO2017/204740
PCT Pub. Date: Nov. 30, 2017

(65) Prior Publication Data
US 2018/0109304 A1    Apr. 19, 2018

Related U.S. Application Data

(60) Provisional application No. 62/342,732, filed on May 27, 2016.

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0417* (2013.01); *H04B 7/0626* (2013.01);
(Continued)

(58) Field of Classification Search
CPC .. H04B 7/0617; H04B 7/0626; H04B 7/0639; H04B 7/0695; H04B 7/088; H04B 7/063; H04L 25/0224
See application file for complete search history.

(56) References Cited

U.S. PATENT DOCUMENTS

| | | | | |
|---|---|---|---|---|
| 2010/0238824 | A1* | 9/2010 | Farajidana | H04B 7/0417 370/252 |
| 2011/0291891 | A1* | 12/2011 | Nsenga | H04B 7/0617 342/373 |

(Continued)

FOREIGN PATENT DOCUMENTS

WO    2015141065 A1    9/2015

*Primary Examiner* — Kenneth T Lam
(74) *Attorney, Agent, or Firm* — Coats & Bennett, PLLC

(57) ABSTRACT

A wireless device (14) is configured to receive a reference signal (24) from network equipment (12) using a receiver configuration (16). The receiver configuration (16) uses one or more physical resources at the wireless device (14). The wireless device (14) is also configured to transmit to the network equipment (12) a report (20) indicating that the wireless device (14) received the reference signal (24) using one or more logical resources at the wireless device (14). The one or more logical resources are an abstraction of the one or more physical resources that the receiver configuration (16) uses.

16 Claims, 16 Drawing Sheets

(51) Int. Cl.
*H04L 25/02* (2006.01)
*H04B 7/0417* (2017.01)

(52) U.S. Cl.
CPC ......... *H04B 7/0639* (2013.01); *H04B 7/0695* (2013.01); *H04B 7/088* (2013.01); *H04L 25/0224* (2013.01); *H04B 7/063* (2013.01)

(56) References Cited

U.S. PATENT DOCUMENTS

| | | |
|---|---|---|
| 2012/0086602 A1* | 4/2012 | Park .......................... G01S 3/48 342/372 |
| 2013/0223251 A1 | 8/2013 | Li et al. |
| 2013/0286960 A1* | 10/2013 | Li ....................... H04W 72/042 370/329 |
| 2013/0301454 A1* | 11/2013 | Seol ....................... H04B 7/043 370/252 |
| 2014/0328266 A1 | 11/2014 | Yu et al. |
| 2016/0021548 A1* | 1/2016 | Raghavan .............. H04W 16/28 370/329 |
| 2016/0134353 A1 | 5/2016 | Stirling-Gallacher |
| 2016/0345216 A1* | 11/2016 | Kishiyama ........ H04W 36/0083 |
| 2017/0094531 A1 | 3/2017 | Kakishima et al. |
| 2017/0195998 A1* | 7/2017 | Zhang ................. H04W 72/042 |
| 2017/0302355 A1 | 10/2017 | Islam et al. |

\* cited by examiner

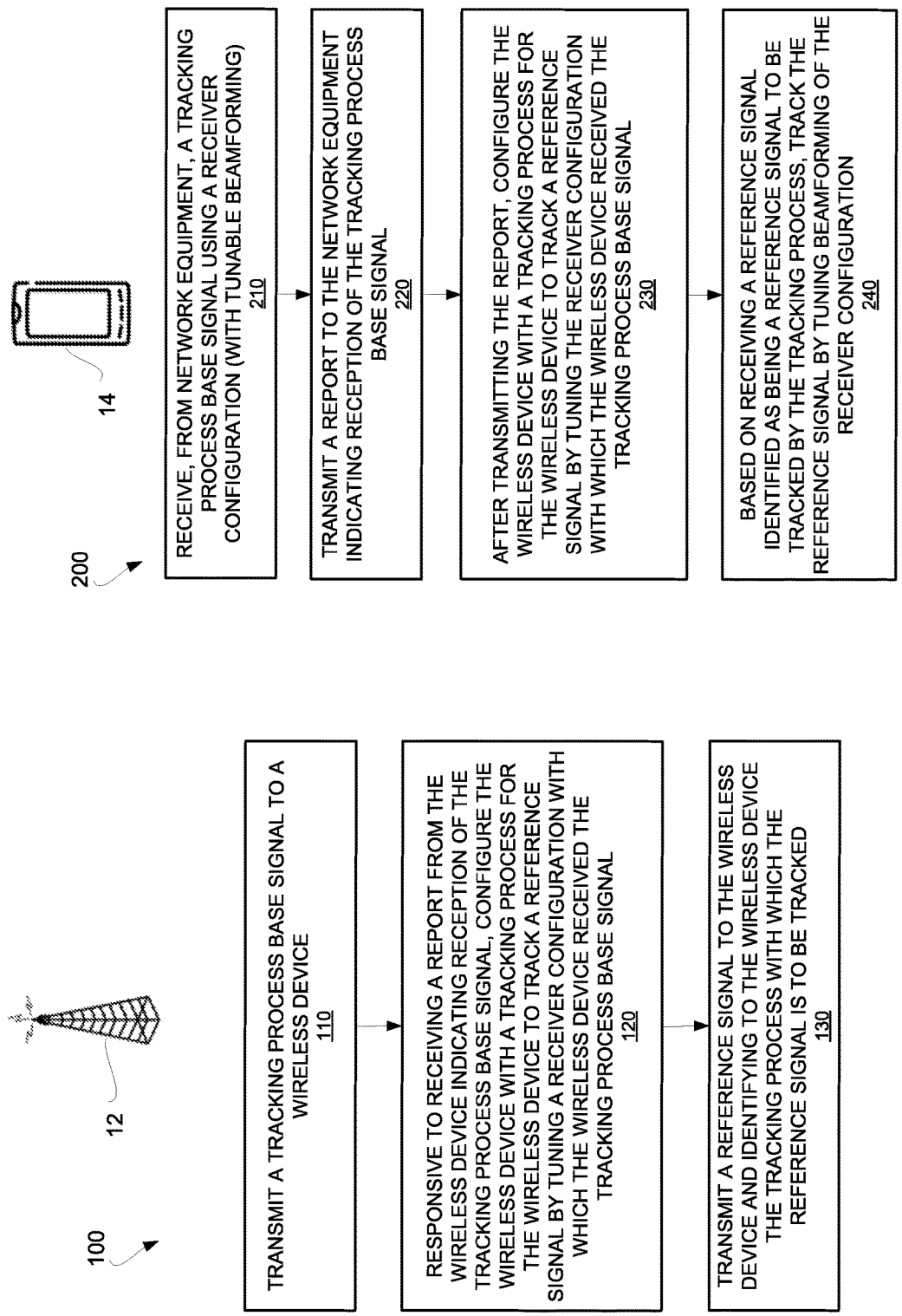

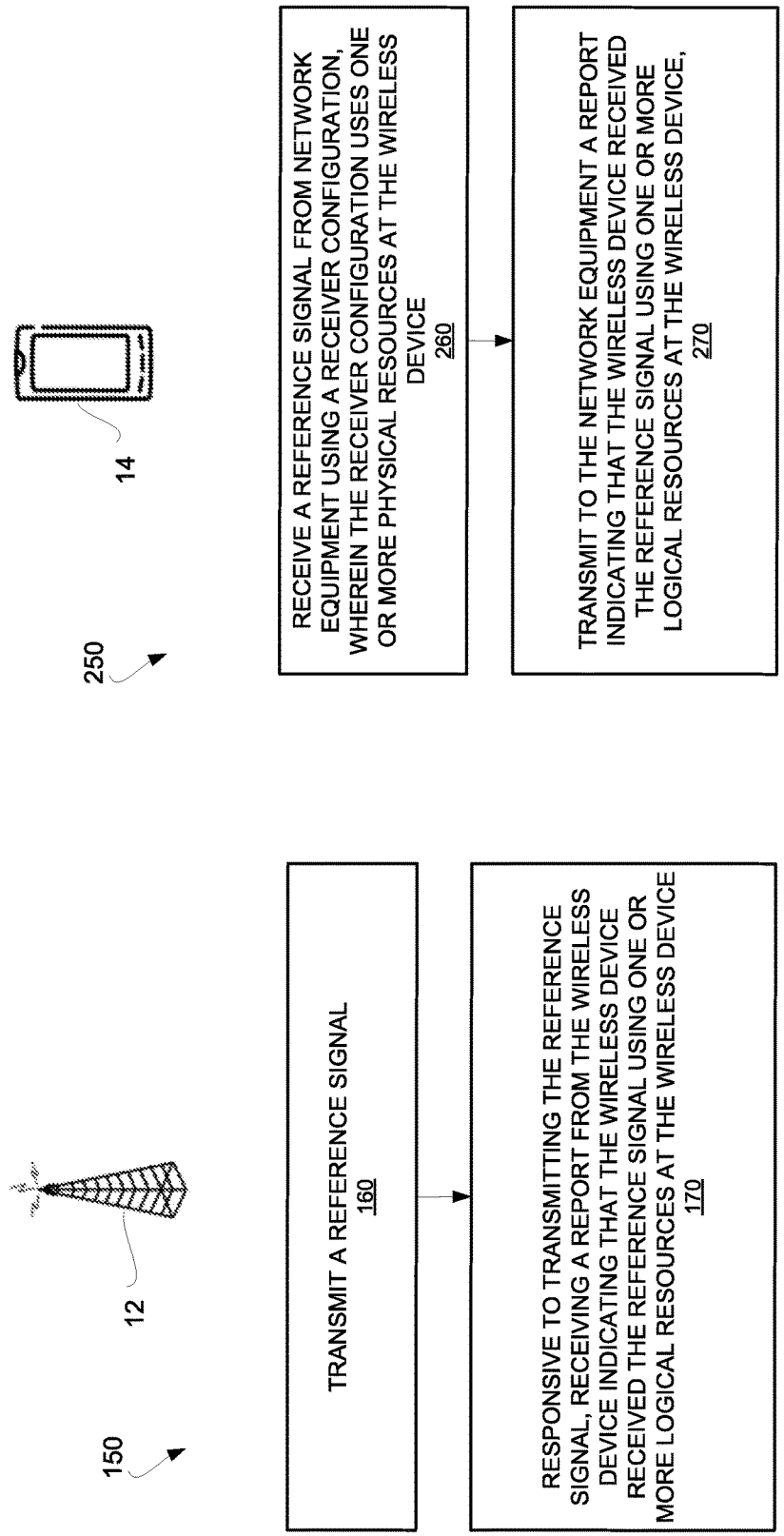

REFERENCE SIGNAL REPORTING IN A WIRELESS COMMUNICATION SYSTEM

RELATED APPLICATIONS

This application claims priority from U.S. Provisional Patent Application Ser. No. 62/342,732, which was filed on 27 May 2016 and is incorporated by reference herein in its entirety.

BACKGROUND

Many implementations of 5G base stations are expected to utilize so-called analog beamforming. This is due to the higher complexity, mostly from a hardware perspective, of implementing so-called digital beamforming. The latter imposes fewer functionality restrictions but is rather more costly to realize.

As used herein, "beamforming" means that a transmitter can amplify transmitted signal power in selected directions, while suppressing transmitted signal power in other directions. Correspondingly, a receiver can amplify signals received from selected directions while weakening unwanted signals in other directions. Analog beamforming in this context means that beamforming can only be applied to one direction or a limited set of directions at a time (e.g. in one OFDM symbol) by each transmitter/receiver. An array of multiple transmit antennas or receive antennas must be used to transmit or receive in multiple directions at the same time. To beamform, a signal is transmitted from multiple transmit antennas, but with individually adjusted phase shifts or time delays, which effectively creates a beam in the resulting transmit radiation pattern of the signal—e.g., through controlled constructive and destructive interference of the phase-shifted signals from individual antenna elements. The beam direction depends on the phase shifts of the antenna elements. Similarly, in the case of a receiver, phase shifts between antenna elements can be used to steer the maximal antenna sensitivity toward a desired direction.

Beamforming allows the received signal to be stronger for an individual connection, thereby enhancing throughput and coverage for that connection. It also enables a reduction in the interference from unwanted signals, thereby enabling several simultaneous transmissions over multiple individual connections using the same time-frequency resource, so called spatial multiplexing or MIMO using either a single user, SU-MIMO, or multiple users, MU-MIMO.

An important problem with beamforming is to decide which beam(s) (i.e., which direction(s)) to use for transmission and/or reception. To support base station beamforming, a number of reference signals may be transmitted in different beam directions, respectively, from the base station. Each User Equipment (UE) can measure these reference signals and report the measurement results to the base station. The base station can then use these measurements to decide which beam(s) to use for data transmission to one or more UEs. As further described herein, a network can use a combination of persistent and dynamic reference signals for this purpose.

The persistent reference signals, denoted herein as beam reference signals (BRS), are transmitted repeatedly in a large number of different beam directions. This allows a UE to measure the BRS when transmitted in different beams, without any special arrangement or instruction for that UE from perspective of the base station. The UE reports the received powers for different BRS back to the base station, along with the index of the BRS, given for example by the BRS sequence and the time and frequency position of the particular BRS. By reporting a BRS index and an associated received power of that BRS, the UE is effectively reporting its preferred beam. The UE may report a list of BRS indices and associated powers, for example, its top eight strongest BRSs.

The base station can then transmit dedicated reference signals to a particular UE, using one or more beams or beam directions that were reported as strong for that UE. These are dedicated reference signals and may thus only be present when the UE has data to receive, and they give more detailed feedback information of the beamformed channel, such as co-phasing information of the polarizations and the recommended transport block size, as well as the transmission rank in case of spatial multiplexing. Since the BRS is transmitted repeatedly over a large number of beams, the repetition period should be relatively long, to avoid using too much resource overhead for the BRS transmissions.

The dynamic reference signals, denoted herein as channel-state information reference signals (CSI-RS) or beam-refinement reference signals (BRRS), are transmitted only when needed for a particular connection. The CSI-RS is the 3GPP terminology for a schedulable, and typically UE-specific, reference signal that can be utilized for various purposes such as channel acquisition and beam management. Herein the terminology of BRRS is used when referring to such a reference signal when used for receive beam selection and tracking. CSI-RS is used when referring to such a reference signal when used to acquire that channel state information for feedback of e.g. preferred modulation and coding scheme (MCS). The decisions of when and how to transmit the CSI-RS are made by the base station and signaled to the involved UEs using a measurement grant or configuration message. When the UE receives a measurement grant it measures on the corresponding CSI-RS. The base station can choose to transmit CSI-RS to a UE using only beam(s) that are known to be strong for that UE, to allow the UE to report more detailed information about those beams. Alternatively, the base station can choose to transmit CSI-RS also using beam(s) that are not known to be strong for that UE, for instance to enable fast detection of new beam(s) in case the UE is moving.

The 5G base stations transmit other reference signals as well. For example, they transmit a demodulation reference signal (DMRS) when transmitting control information or data to a UE. Such transmissions are typically made using beam(s) that are known to be strong for that UE.

In 4G systems, discovery reference signals (DRS) may be used for the same purpose as BRS, as described above. Hence, the LTE UE is configured to perform received power measurement on a set of different DRS signals and report the associated DRS index and measured power for the eight DRS measurements with highest power.

Beamforming is not restricted to base stations. It can also be implemented in the receiver of the UE, further enhancing the received signal and suppressing interfering signals. The UE may also implement transmit beamforming. Similar to a base station, analog beamforming can be used in the UE, which means that the UE can only receive/transmit from/to one direction at a time, unless multiple receivers/transmitters are available. When operating with the 5G base stations, a UE with analog receive beamforming can measure the BRS using different UE receive beams, and then choose the UE receive beam(s) that provides the highest BRSRP (Beam Reference Signal Received Power).

Known implementations of analog beamforming in wireless communication networks do not provide mechanisms for robust management of network and UE beams.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

Embodiments herein include a method performed by network equipment configured for use in a wireless communication system. The method comprises transmitting a reference signal. The method further comprises, responsive to that transmitting, receiving a report from a wireless device indicating that the wireless device received the reference signal using one or more logical resources at the wireless device. A logical resource in this regard is an abstraction of one or more physical resources that a receiver configuration at the wireless device uses for reception.

In some embodiments, the one or more physical resources are one or more antenna arrays, beam formers, or digital processing chains that the receiver configuration at the wireless device uses for reception.

In some embodiments, the report indicates whether the reference signal is receivable by the wireless device simultaneously with another reference signal for example by indicating whether the wireless device received the reference signal using the same one or more logical resources as the one or more logical resources usable to receive the another reference signal.

In some embodiments, the reference signal is a tracking process base signal, and the method further comprises, responsive to receiving the report, configuring the wireless device with a tracking process for the wireless device to track a reference signal by tuning a receiver configuration with which the wireless device received the tracking process base signal.

Alternatively or additionally, in some embodiments, the method further comprises transmitting multiple tracking process base signals to the wireless device; responsive to receiving reports from the wireless device indicating reception of the tracking process base signals respectively using one or more logical resources at the wireless device, configuring the wireless device with multiple tracking processes for separately tracking different reference signals by tuning receiver configurations with which the wireless device respectively received the tracking process base signals; selecting for simultaneous activation, from among the multiple tracking processes, multiple tracking processes that do not use any of the same logical resources; determining network beams on which reference signals respectively tracked by the selected tracking processes are transmitted; and transmitting to the wireless device or receiving from the wireless device control data or user data on the determined network beams simultaneously.

Embodiments also include a method performed by a wireless device configured for use in a wireless communication system. The method comprises receiving a reference signal from network equipment using a receiver configuration. The receiver configuration uses one or more physical resources at the wireless device. The method also comprises transmitting to the network equipment a report indicating that the wireless device received the reference signal using one or more logical resources at the wireless device. The one or more logical resources are an abstraction of the one or more physical resources that the receiver configuration uses.

In some embodiments, the one or more physical resources are one or more antenna arrays, beam formers, or digital processing chains that the receiver configuration at the wireless device uses for reception.

In any of the above embodiments, the report may indicate whether the reference signal is receivable by the wireless device simultaneously with another reference signal by indicating whether the wireless device received the reference signal using the same one or more logical resources as the one or more logical resources usable to receive the another reference signal.

In some embodiments, the reference signal is a tracking process base signal, and the method further comprises, responsive to transmitting the report, configuring the wireless device with a tracking process for the wireless device to track a reference signal by tuning the receiver configuration with which the wireless device received the tracking process base signal.

Alternatively or additionally, in some embodiments, the method further comprises receiving, from the network equipment, multiple tracking process base signals using different receiver configurations, each with tunable beamforming; transmitting reports to the network equipment indicating reception of the tracking process base signals respectively using one or more logical resources at the wireless device; responsive to transmitting the reports, configuring the wireless device with multiple tracking processes for the wireless device to track different reference signals by tuning the respective receiver configurations with which the wireless device received the tracking process base signals; receiving one or more activation messages instructing the wireless device to activate multiple ones of the tracking processes that do not use any of the same logical resources; determining device beams on which reference signals tracked by the activated tracking processes are received; and transmitting to the network equipment or receiving from the network equipment control data or user data on the determined device beams simultaneously.

Embodiments herein also include corresponding apparatus, computer programs, and carriers. For example, some embodiments include network equipment configured for use in a wireless communication system. The network equipment in particular is configured to transmit a reference signal. The network equipment is also configured to, responsive to transmitting the reference signal, receive a report from a wireless device indicating that the wireless device received the reference signal using one or more logical resources at the wireless device, wherein a logical resource is an abstraction of one or more physical resources that a receiver configuration at the wireless device uses for reception.

In some embodiments, the one or more physical resources are one or more antenna arrays, beam formers, or digital processing chains that the receiver configuration at the wireless device uses for reception.

In some embodiments, the report indicates whether the reference signal is receivable by the wireless device simultaneously with another reference signal by indicating whether the wireless device received the reference signal using the same one or more logical resources as the one or more logical resources usable to receive the another reference signal.

In some embodiments, the reference signal is a tracking process base signal, and the network equipment is further configured to, responsive to receiving the report, configure the wireless device with a tracking process for the wireless device to track a reference signal by tuning a receiver configuration with which the wireless device received the tracking process base signal.

Alternatively or additionally, in some embodiments, the network equipment is further configured to transmit multiple tracking process base signals to the wireless device; responsive to receiving reports from the wireless device indicating reception of the tracking process base signals respectively using one or more logical resources at the wireless device, configure the wireless device with multiple tracking processes for separately tracking different reference signals by tuning receiver configurations with which the wireless device respectively received the tracking process base signals; select for simultaneous activation, from among the multiple tracking processes, multiple tracking processes that do not use any of the same logical resources; determine network beams on which reference signals respectively tracked by the selected tracking processes are transmitted; and transmit to the wireless device or receiving from the wireless device control data or user data on the determined network beams simultaneously.

Embodiments also include a wireless device configured for use in a wireless communication system. The wireless device is configured to receive a reference signal from network equipment using a receiver configuration. The receiver configuration uses one or more physical resources at the wireless device. The wireless device is also configured to transmit to the network equipment a report indicating that the wireless device received the reference signal using one or more logical resources at the wireless device. The one or more logical resources are an abstraction of the one or more physical resources that the receiver configuration uses.

In some embodiments, the one or more physical resources are one or more antenna arrays, beam formers, or digital processing chains that the receiver configuration at the wireless device uses for reception.

In any of the above embodiments, the report may indicate whether the reference signal is receivable by the wireless device simultaneously with another reference signal by indicating whether the wireless device received the reference signal using the same one or more logical resources as the one or more logical resources usable to receive the another reference signal.

In some embodiments, the reference signal is a tracking process base signal, and the wireless device is also configured to, responsive to transmitting the report, configure the wireless device with a tracking process for the wireless device to track a reference signal by tuning the receiver configuration with which the wireless device received the tracking process base signal.

Alternatively or additionally, in some embodiments, the wireless device is also configured to receive, from the network equipment, multiple tracking process base signals using different receiver configurations, each with tunable beamforming; transmit reports to the network equipment indicating reception of the tracking process base signals respectively using one or more logical resources at the wireless device; responsive to transmitting the reports, configure the wireless device with multiple tracking processes for the wireless device to track different reference signals by tuning the respective receiver configurations with which the wireless device received the tracking process base signals; receive one or more activation messages instructing the wireless device to activate multiple ones of the tracking processes that do not use any of the same logical resources; determine device beams on which reference signals tracked by the activated tracking processes are received; and transmit to the network equipment or receiving from the network equipment control data or user data on the determined device beams simultaneously.

BRIEF DESCRIPTION OF THE DRAWINGS

FIG. 5 is a logic flow diagram of a method performed by network equipment according to some embodiments.

FIG. 6 is a logic flow diagram of a method performed by a wireless device according to some embodiments.

FIG. 7 is a logic flow diagram of a method performed by network equipment according to other embodiments.

FIG. 8 is a logic flow diagram of a method performed by a wireless device according to other embodiments.

DETAILED DESCRIPTION

Figure 1:
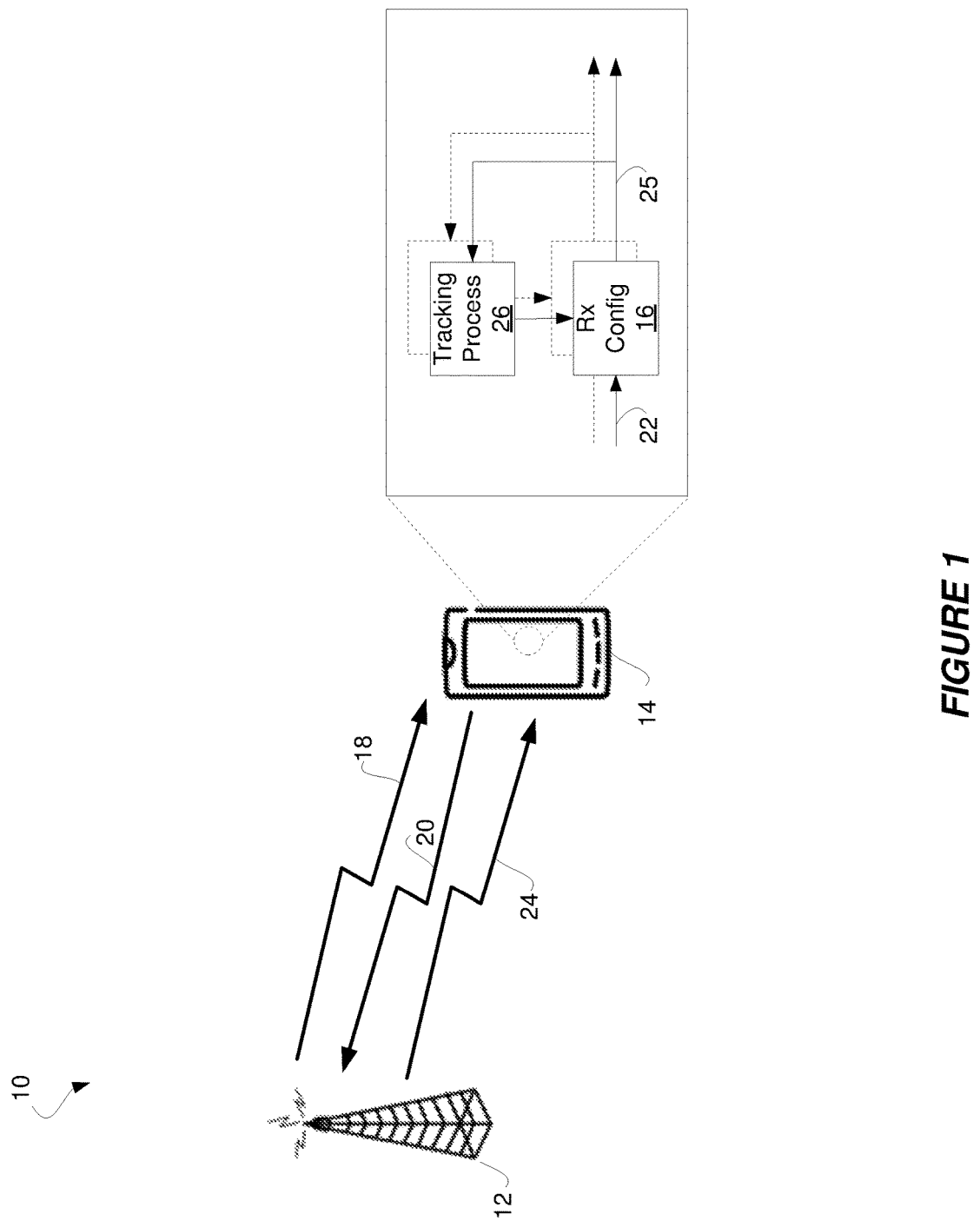
FIG. 1 is a block diagram of a wireless communication system that includes a wireless device and network equipment according to some embodiments.

FIG. 1 shows a wireless communication system 10 according to one or more embodiments. The system 10 includes network equipment 12 shown for example as a base station. The system 10 also includes a wireless device 14, e.g., a user equipment (UE). The network equipment 12 is configured to transmit radio signals to and receive radio signals from the wireless device 14.

The wireless device 14 in this regard has one or more receiver configurations 16 that are each tunable for radio signal reception. Tuned in a certain way, for example, a receiver configuration 16 may employ particular antenna array(s), beam former(s), digital processing chain(s), and/or other physical resources. Tuned differently, the same receiver configuration 16 may configure those same physical resources differently and/or use one or more different antenna array(s), beam former(s), digital processing chain(s), and/or different physical resources. In one particular example, for instance, different tunings of a given receiver configuration 16 may be used by the wireless device 14 to receive on different receive beams within a defined set for that receiver configuration (e.g., with different geographically pointing directions for receiving on different propagation paths).

One or more embodiments herein exploit this tunability at the wireless device 14 such that the wireless device 14 autonomously tracks a reference signal transmitted by the network equipment 12. In particular, the wireless device 14 itself controls receiver configuration tunability (e.g., in terms of beamforming) as needed to receive the reference signal according to one or more criteria, such as with maximum quality possible. Accordingly, as used herein, when the wireless device tracks a reference signal by tuning a receiver configuration with which the reference signal is received, the wireless device autonomously tracks that reference signal. Moreover, with the wireless device 14 remaining sovereign over its tunability in this regard, autonomous tracking in some embodiments may even remain transparent to the network equipment 12. That is, in some embodiments, the network equipment 12 not only lacks control of the tuning of a receiver configuration 16 at the device 14, but may also remain unaware of the particular tuning used. Accordingly, in some embodiments, autonomous tracking implies that the wireless device updates the receiver configuration (e.g. the receive beam) but the wireless device does not indicate to the network equipment 12 that it has change the receiver configuration. In some sense, this may prove advantageous in that the network equipment 12 is insulated from the details underlying the device's tracking of a reference signal that the network equipment 12 transmits. This may allow the network equipment 12 to communicate with a number of different types of wireless devices with less complexity.

In any event, some embodiments herein enable autonomous reference signal tracking through the use of a "tracking process" configured by the network equipment 12 at the wireless device 14. In particular, as shown in the example of FIG. 1, the network equipment 12 transmits a so-called tracking process base signal 18 (e.g., a beam reference signal, BRS) to the wireless device 14. In some embodiments, this tracking process base signal 18 is a periodically transmitted reference signal, e.g., whose sequence and/or location in the time/frequency domain is known a priori to the wireless device 14. Regardless, the wireless device 14 receives this tracking process base signal 18 using a certain receiver configuration 16 that is tunable, e.g., in terms of the beamforming used. The wireless device 14 may for instance operate one or more receiver configurations 16 in a discovery or searching mode. In this mode, a receiver configuration 16 is adjusted (i.e., tuned) to have different settings in search of the (or any) tracking process base signal 18. As shown, for example, a receiver configuration 16 may receive an input signal 22 and process it according to different tunings of the receiver configuration 16. Upon recognizing that this processing produces the tracking process base signal 18 as an output signal 25, the wireless device 14 detects that it has received the tracking process base signal 18.

No matter the particular approach used for detecting such reception, though, the wireless device 14 correspondingly transmits a report 20 to the network equipment 12 indicating reception of the tracking process base signal 18. In at least some embodiments, this report effectively just notifies the network equipment 12 that the wireless device 14 received the tracking process base signal 18, e.g., by identifying the particular tracking process base signal 18 received, as distinguished from any other tracking process base signals transmitted by the network equipment 12. The report 20 may also indicate reception performance metric(s) associated with that reception, such as a strength or quality with which the signal 18 was received. In at least one embodiment, the report 20 indicates reception of the tracking process base signal 18, without more specifically indicating the receiver configuration 16 with which the base signal 18 was received or indicating the receiver configuration's tuning.

Responsive to receiving this report 20, the network equipment 12 configures the wireless device 14 with a tracking process 26. This tracking process 26 is a process for the wireless device 12 to autonomously (and perhaps transparently to the network equipment) track a reference signal 24 by tuning the receiver configuration 16 with which the device 14 received the tracking process base signal 18. Because the receiver configuration 16 that is to be tuned for reference signal tracking with the tracking process 26 is the receiver configuration 16 with which the tracking process base signal 18 was received, the tracking process 26 is effectively based (i.e., founded) on the tracking process base signal 18 (e.g., for the tracking processes' entire lifetime). The tracking process base signal 18 as used herein therefore refers to any signal whose reception and reporting by the wireless device 14 instigates or triggers configuration of a tracking process.

The network equipment 12 transmits the reference signal 24 to be tracked to the wireless device 14. And the network equipment 12 identifies to the wireless device 14 the tracking process 26 with which the reference signal 24 is to be tracked. That is, the network equipment 12 identifies that the reference signal 24 is to be tracked with the configured tracking process 26.

In some embodiments, the network equipment 12 identifies the tracking process 26 in this way when configuring the tracking process 26. The network equipment 12 may for instance transmit a setup signal or message to the wireless device 14 indicating an identity of the tracking process 26 (e.g., as assigned by the network equipment 12). The setup signal or message may also indicate an identity of the reference signal 24 to be tracked (at least initially) by that tracking process 26. The tracking process base signal 18 may therefore differ from this setup signal in that the setup signal for configuring the tracking process 26 is transmitted to the wireless device 14 only after the tracking process 26's configuration has been triggered by the reception and reporting of the tracking process base signal 18.

For example, in one or more embodiments where the tracking process base signal 18 is a reference signal, the reference signal 24 to be tracked (at least initially) may be the tracking process base signal 18 itself. Where the tracking process base signal 18 is periodically transmitted, this may mean that the tracking process 26 is configured based on the wireless device's first reception and reporting of the tracking process base signal 18, after which point the tracking process 26 tracks the tracking process base signal 18 as periodic transmissions of that signal 18 are made. A setup signal or message may be sent after the device's first reception and reporting of the tracking process base signal 18, with the setup signal indicating an identifier of the tracking process base signal 18 as the reference signal to be tracked. This may be done directly with a reference signal identity and/or indirectly using an identifier for the report 20 which reported reception of the tracking process base signal 18.

In other embodiments, the reference signal 24 to be tracked is different than the tracking process base signal 18. Rather than a periodically transmitted reference signal, for instance, the reference signal 24 to be tracked may be a dynamically scheduled reference signal. In this case, the network equipment 12 may dynamically schedule transmission of the reference signal 24 and identify the tracking process 26 with which the reference signal 24 is to be tracked within a scheduling message to the device 14 indicating scheduling of the reference signal 24 (e.g., in terms of time and/or frequency resources over which the reference signal 24 is to be transmitted).

No matter when or how the network equipment 14 identifies the reference signal 24 to be tracked and the tracking process 26 to track it, the wireless device 14 autonomously tracks that reference signal 24 by tuning the receiver configuration 16 associated with the identified tracking process 26. That is, based on receiving a reference signal 24 identified as being a reference signal to be tracked by the tracking process 26, the device 14 autonomously tracks the reference signal by tuning the receiver configuration 16. The device 14 may for instance tune the beamforming of or used by the receiver configuration 16.

In some embodiments, tracking of the reference signal 24 involves adjusting settings of the receiver configuration 16 (e.g., in terms of beamforming) as needed to receive the reference signal 24 according to one or more criteria, such as with the maximum quality possible. This tracking may be performed in the face of the network equipment 12 varying the transmitter configuration with which the reference signal 24 is transmitted (e.g., in terms of beamforming), in the face of varying channel conditions, propagation paths, or any combination thereof. No matter the particular reason why the reference signal 24 need be tracked, the reference signal 24 may be said to be tracked when the wireless device 14 is able to still receive the reference signal 24 with the receiver configuration 16 (e.g., in compliance with one or more signal quality criteria) through tuning of that receiver configuration 16. When the wireless device 14 is no longer able to receive the reference signal 24 (e.g., in compliance with the one or more signal quality criteria) by tuning the receiver configuration 16, the wireless device 14 may be said to have lost track of the reference signal 24 with that receiver configuration 16.

Figure 2:
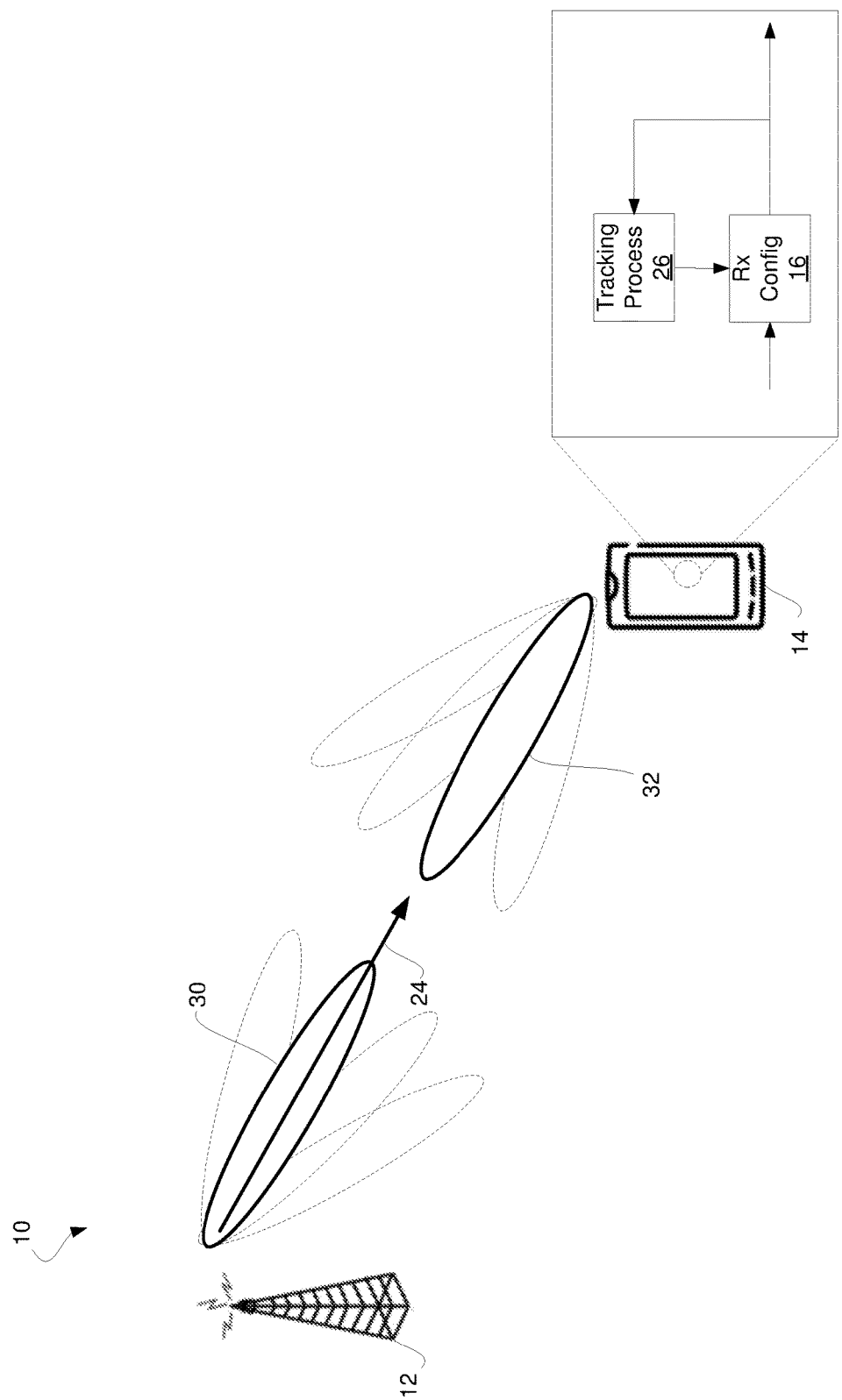
FIG. 2 is a block diagram of a wireless device and network equipment for tracking a reference signal by the wireless device tuning a receiver configuration in terms of beamforming.

FIG. 2 illustrates one example where the network equipment 12 in the wireless communication system 10 is configured with beamforming capability. The network equipment 12 in this regard may be configured with a set of multiple network beams on which to transmit. FIG. 2 illustrates a set of four network beams in this regard as an example. In some embodiments, the reference signal 24 to be tracked by a certain tracking process 26 is transmitted on a certain network-beam, e.g., beam 30 in FIG. 1. As long as the tracked reference signal 24 is transmitted on a certain network-beam, the tracking process 26 in some sense effectively tracks that network beam 30 by tracking the reference signal 24. Yet in at least some embodiments the network beam tracking effect of the tracking process 26 remains transparent to the wireless device 14 or the tracking process 26 itself, such as in embodiments where the wireless device 14 is insulated from details about the network equipment's transmitter configuration. Indeed, in one or more embodiments, the tracking process 26 simply tunes on which of multiple configured device beams the wireless device 14 receives the reference signal 24. As shown in FIG. 2, for instance, the tracking process 26 may tune the receiver configuration 16 to receive the reference signal 24 on device beam 32, e.g., by switching the receiver configuration 16 away from receiving the reference signal 24 on a different device beam that has poorer reception performance.

Some embodiments therefore involve the network equipment 12 transmitting the tracking process base signal 18 and the reference signal 24 to be tracked on the same network beam 30. This of course is especially the case where the reference signal 24 to be tracked is the tracking process base signal 18, e.g., in the form of a periodically transmitted reference signal. In this way, the tracking process 26 may effectively (and perhaps naively) track the network beam over which the associated receiver configuration 16 first received and reported the tracking process base signal 18, by tracking the tracking process base signal 18 through tuning of the receiver configuration 16.

Alternatively or additionally, as suggested by FIG. 1, the wireless device 14 may be configured with multiple tracking processes for respectively tracking multiple reference signals, e.g., simultaneously. In this case, the network equipment 12 may transmit tracking process base signals (e.g., BRS) to the wireless device 14. Responsive to receiving reports from the wireless device 14 indicating reception of the tracking process base signals, the network equipment 12 may configure the wireless device 14 with multiple tracking processes for separately tracking different reference signals by tuning receiver configurations with which the wireless device 14 respectively received the tracking process base signals. The network equipment 12 may correspondingly transmit reference signals to the wireless device 14 and identify to the wireless device 14 the respective tracking processes with which the reference signals are to be tracked. The wireless device 14 autonomously tracks these reference signals by tuning (e.g., beamforming) of the respective receiver configurations. This tracking may be performed transparently to the network equipment 12.

In at least some embodiments, each tracking process operates independently or separately in terms of base signal transmission, measurement, reporting, tracking, and the like.

Figure 3:
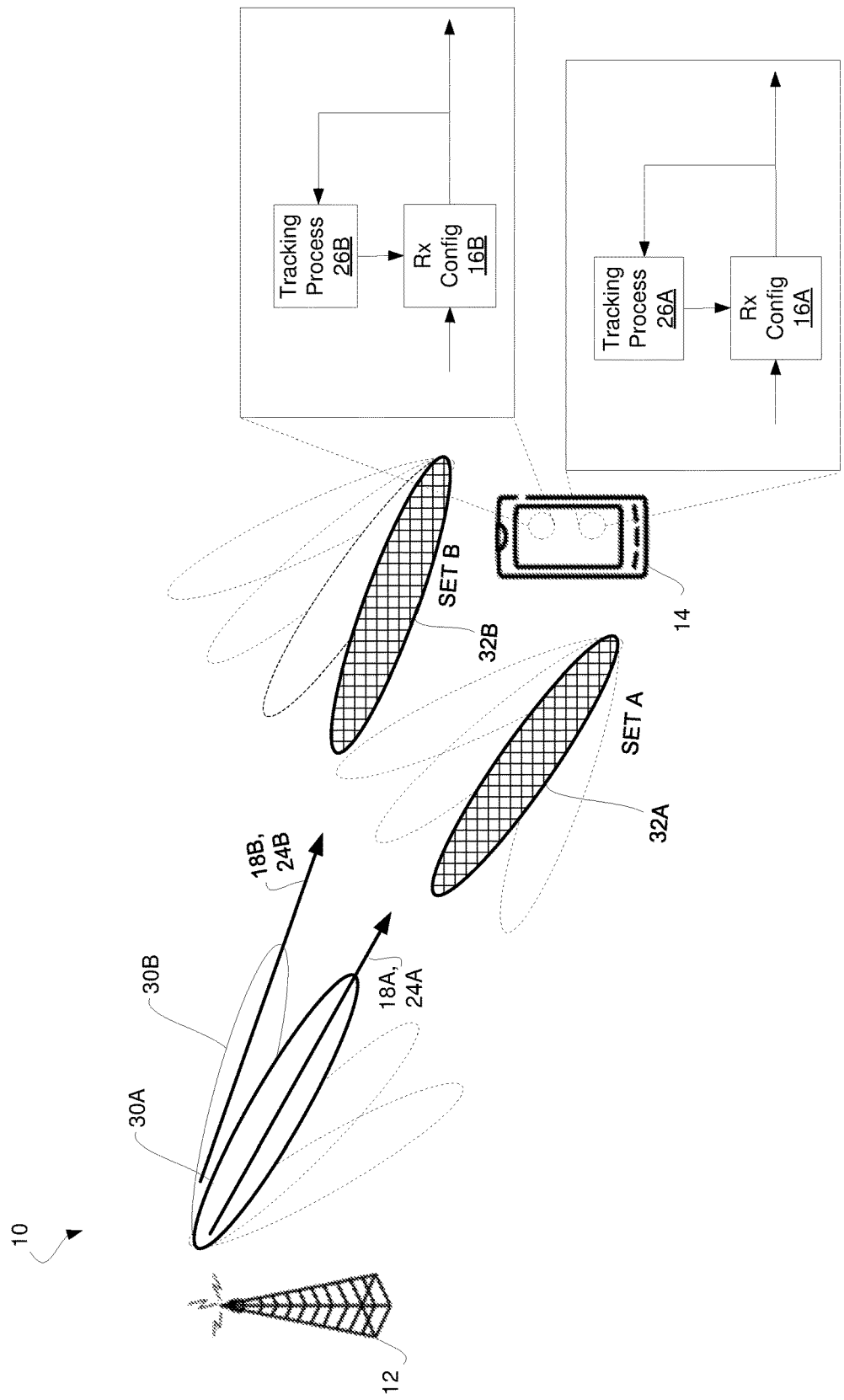
FIG. 3 is a block diagram of a wireless device and network equipment for tracking multiple reference signals on respective network beams by the wireless device tuning a receiver configuration in terms of beamforming.

In one or more embodiments, the network equipment 12 transmits the multiple tracking process base signals and/or the reference signals to the wireless device 14 on different respective network beams. As shown in FIG. 3, for instance, the network equipment 12 in the wireless communication system 10 may transmit one tracking process base signal 18A over network beam 30A and another tracking process base signal 18B over network beam 30B, e.g., according to a static mapping between tracking process base signals and network beams. At the wireless device 14, one receiver configuration 16A (e.g., corresponding to one antenna panel) is tunable for receiving on any device beam within Set A, and another receiver configuration 16B (e.g., corresponding to another antenna panel) is tunable for receiving on any device beam within Set B. Receiver configuration 16A detects tracking process base signal 18A, whereupon tracking process 26A is configured based on the device's reporting reception of base signal 18A. Meanwhile, receiver configuration 16B detects tracking process base signal 18B, whereupon tracking process 26B is configured based on the device's reporting reception of base signal 18B. In this way, different tracking processes 26A, 26B are configured based on reception of tracking process base signals 18A, 18B that were transmitted on different network beams 30A, 30B.

In some embodiments as shown in FIG. 3, the network equipment 12 may also transmit reference signals 24A, 24B to be tracked by those tracking processes 26A, 26B on the same network beams 30A, 30B. Again, this is especially the case where the reference signals 24A, 24B to be tracked are the tracking process base signals 18A, 18B, e.g., in the form of periodically transmitted reference signals (e.g., BRS). Regardless, for as long as the reference signals 24A, 24B are transmitted on the respective network beams 30A, 30B, the tracking processes 26A, 26B may effectively (and naively) track the network beams 30A, 30B by tracking the reference signals 24A, 24B. The tracking processes 26A, 26B may moreover do so simultaneously and independently of one another.

In still other embodiments, though, a tracking process may not be said to effectively track a network-beam, at least throughout the tracking process's lifetime. Indeed, in some embodiments, the reference signal 24 to be tracked by the tracking process 26 may be transmitted over a different network beam than that over which the tracking process base signal 18 was transmitted. Or, the reference signal 24 to be tracked by the tracking process 26 may be switched to being transmitted over a different network beam under some circumstances. Or still further, the reference signal to be tracked by the tracking process 26 may change to a different reference signal, which may or may not be transmitted over the same network-beam.

Consider for instance embodiments where a tracking process may be switched between two different modes. In a first mode (a.k.a. BRS tracking mode), the tracking process tracks a tracking process base signal 18 in the form of a periodically transmitted reference signal (e.g., BRS). In the second mode, by contrast, the same tracking process 26 tracks a dynamically scheduled reference signal. This dynamically scheduled reference signal may be a so-called beam refinement reference signal (BRRS). A beam refinement reference signal (BRRS) may in some embodiments be configured as described in U.S. provisional application Ser. No. 62/323,557, the entire contents of which is incorporated by reference herein. In this case, the second mode may be referred to as BRRS tracking mode.

In some embodiments, the BRS forming the basis of the tracking process 26 is (statically) mapped to being transmitted over a specific network-beam. The BRRS, however, may be dynamically scheduled on any network-beam. The BRRS may for instance initially be scheduled to be on the same network beam as the BRS for the tracking process 26. But upon detecting one or more conditions indicating difficulty in tracking the BRRS with the tracking process 26, the network equipment 12 may switch the BRRS to a different network beam for potentially better reception performance (e.g., based on detected uplink reference symbols).

Alternatively, the network equipment 12 may instruct the wireless device 14 to enter BRS mode. In this mode, the network equipment 12 may request the wireless device 12 to report BRSs receivable using the receiver configuration 16 for the tracking process 16. Responsive to receiving this report, the network equipment 12 may instruct the device 14 to switch from tracking the BRRS to tracking one of the reported BRSs using the tracking process 26.

In some sense, then, any given tracking process may be "re-used" or "re-cycled" for tracking a different reference signal (e.g., BRS) on a different network-beam. Viewed in this way, a specific tracking process may be configured to effectively (and naively) track a certain network beam by tracking a certain reference signal (e.g., BRS), but may be reconfigured to tracking a different network beam by tracking a different reference signal (e.g., a different BRS).

That said, in at least some embodiments, any given tracking process may disassociate itself with the BRS it was last tracking in BRS mode, when it enters BRRS mode. That is, the tracking process ceases or refrains from tracking the BRS, and instead tracks only the BRRS since the BRRS may be transmitted on a different network-beam.

No matter the particular reference signals tracked (e.g., BRS or BRRS), the network equipment 12 in some embodiments advantageously selects from among multiple tracking processes one or more of the processes to "activate". In particular, the network equipment 12 in this regard may select a tracking process to activate. The network equipment 12 may then determine a propagation path (e.g., network-beam) on which a reference signal tracked by the activated tracking process is transmitted. The network equipment 12 then transmits to the wireless device 12 control data or "user" data (i.e., payload) on the determined propagation path (e.g., network-beam). That is, the network equipment 12 may use parallel monitoring of multiple tracking processes in order to effectively evaluate over which propagation path (e.g., network-beam) the network equipment should transmit data to the wireless device 14.

In some embodiments, the network equipment performs this selection according to one or more rules, e.g., specified in terms of reception performance metrics respectively reported for the tracking processes by the wireless device 14. In one embodiment, for example, the network equipment 14 compares the metrics and selects whichever tracking process has the best reception performance quality reported by the wireless device 14 (e.g., as measurements of the reference signals being tracked by those processes).

Alternatively or additionally, the network equipment 12 may receive, for each of the tracking processes, a report from the wireless device 14 indicating one or more logical resources that are used by the receiver configuration with which the wireless device 14 received the tracking process base signal for that tracking process. A logical resource in this regard is an abstraction of one or more physical resources used by a receiver configuration. A logical resource may be for instance an abstraction of one or more antenna arrays (e.g., panels), beam formers, or digital processing chains that a receiver configuration at the wireless device 14 uses for reception.

The network equipment 12 may be configured to select for simultaneous activation, from among the multiple tracking processes, multiple tracking processes that do not use any of the same logical resources. The network equipment 12 may then determine network beams on which reference signals respectively tracked by the selected tracking processes are transmitted.

Accordingly, the network equipment 12 may then transmit to the wireless device 12 control data or user data on the determined network beams simultaneously.

Figure 4:
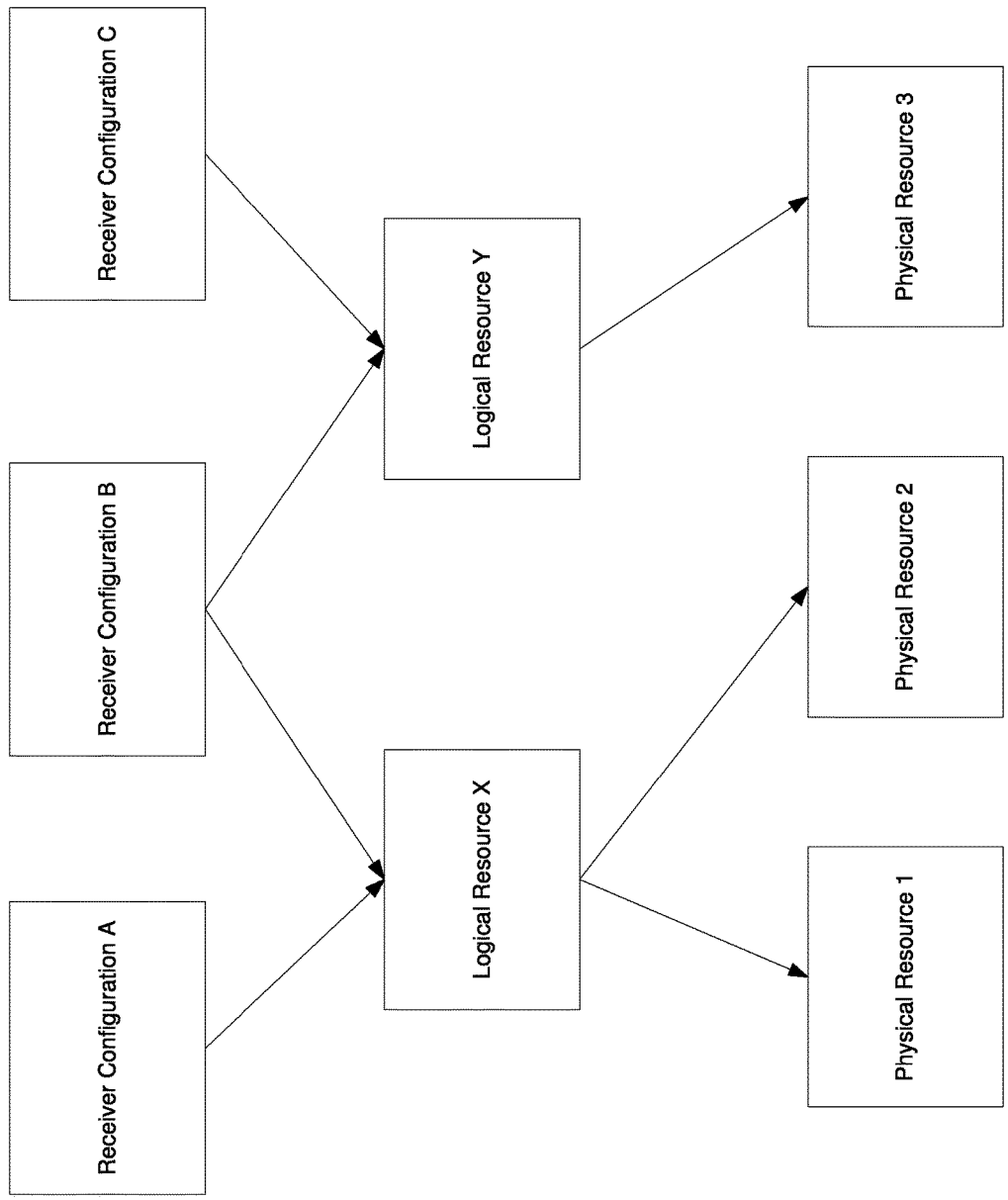
FIG. 4 is a block diagram of an example mapping between physical resources and logical resources at a wireless device.

FIG. 4 illustrates one example in this regard, where different receiver configurations A, B, and C use logical resources X and Y. These logical resources X and Y as shown correspond to different physical resources (although in some embodiments they may correspond to at least some of the same physical resources). In any event, as shown, receiver configurations A and C use different logical resources X and Y, meaning that they are "compatible" and may be selected for simultaneous activation. On the other hand, receiver configuration B uses some of the same logical resources as both configurations A and B, and therefore may not be selected for simultaneous activation with either configuration A or B.

In some embodiments, the wireless device 14 advantageously indicates the logical resource(s) used by the receiver configuration 16 associated with a certain tracking process 26, e.g., upon reporting reception of the tracking process base signal 18 prior to configuring the tracking process. The report may for instance indicate the one or more logical resources used by the receiver configuration that receives the tracking process base signal 18, by indicating the resource(s) with a bitmap, i.e., a set of one or more bits whose values are mapped to different indications of the logical resources used. This bitmap may include different bit positions respectively dedicated to indicating whether different logical resources are used. Alternatively, the bitmap indicates is the representation of the logical resource index. The report may thereby indicate whether transmit beams are received using the same or different logical resources, using logical indices assigned to different logical resources. If logically resources are different, it is understood that the transmit beams can be received simultaneously.

Alternatively or additionally, the report may indicate the logical resource(s) used by the receiver configuration 18 associated with a certain tracking process 26, by selectively reporting reference signals that can be received at the same time. That is, the wireless device 14 may only report reference signals that are received using different logical resources. In this sense, then, the report may indicate whether a reference signal is receivable simultaneously with another reference signal by indicating whether the wireless device 14 received the reference signal using the same one or more logical resources as the one or more logical resources usable to receive another reference signal.

No matter how indicated, though, simply reporting logical resources used by a receiver configuration (rather than physical resources) advantageously insulates the network equipment 12 from details underlying the receiver configuration.

In some embodiments, note that the receiver configuration with which a tracking process is set up never changes, even if the network beam or BRS/BRRS tracking mode changes. Whatever tunable receiver configuration was used to receive the initial BRS, that is the receiver configuration that will be used throughout the tracking process's lifetime.

Note that network beams described herein need not be associated with the same radio node (e.g., base station), but may cooperatively be provided by multiple radio nodes.

Embodiments herein may use any of one or more communication protocols known in the art or that may be developed, such as IEEE 802.xx, CDMA, WCDMA, GSM, LTE, UTRAN, WiMax, or the like. Accordingly, although sometimes described herein in the context of 5G, the principles and concepts discussed herein are applicable to 4G systems and others.

A wireless device is any type device capable of communicating with another radio node wirelessly over radio signals. A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

A device beam as used herein may refer to a transmit beam on which the wireless device is configured or capable of transmitting, or a receive beam on which the wireless device is configured or capable of receiving. A transmit beam in this regard refers to a beam in a transmit radiation pattern of a signal, with a beam direction dependent for instance on the phase shifts of the transmit antenna elements. A receive beam similarly refers to a beam of maximal antenna sensitivity in a certain direction dependent for instance on the phase shifts of receive antenna elements.

As used herein, "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network. The list above is not intended to express just alternative radio network nodes, but to express various examples of classes of network equipment as well as examples of specific network equipment.

A network beam as used herein may refer to a transmit beam on which the network equipment 12 is configured or capable of transmitting, or a receive beam on which the network equipment 12 is configured or capable of receiving.

Although a signal has been referred to as being transmitted "on" a beam, a signal may in other senses be said to be transmitted "in" or "over" a beam.

In view of the above variations and modifications, network equipment 12 in some embodiments generally performs the method 100 shown in FIG. 5. The method 100 may comprise transmitting a tracking process base signal 18 (e.g., a BRS) to a wireless device 14 (Block 100). The method 100 may further comprise, responsive to receiving a report 20 from the wireless device 14 indicating reception of the tracking process base signal 18, configuring the wireless device 14 with a tracking process 26 for the wireless device 14 to track a reference signal 24 (e.g., BRS or BRRS) by tuning a receiver configuration 16 with which the wireless device 14 received the tracking process base signal 18 (Block 110). The wireless device 14 may for instance track the reference signal 24 autonomously and transparently to the network equipment 12. The method 100 may further comprise transmitting a reference signal 24 (e.g., BRS or BRRS) to the wireless device 14 and identifying to the wireless device 14 that the reference signal 24 is to be tracked with the configured tracking process 26 (Block 120).

FIG. 6 correspondingly shows a method 200 performed by the wireless device 14 according to some embodiments. As shown, the method 200 may comprise receiving, from network equipment 12, a tracking process base signal 18 using a receiver configuration 16 (e.g., with tunable beamforming) (Block 210). The method 200 may further comprise transmitting a report 20 to the network equipment 12 indicating reception of the tracking process base signal 18 (Block 220). The method 200 may also comprise, after transmitting the report 20, configuring the wireless device 14 with a tracking process 26 for the wireless device 14 to track a reference signal 24 by tuning the receiver configuration 26 with which the wireless device 14 received the tracking process base signal 18 (Block 230). The wireless device 14 may for instance track the reference signal 24 autonomously and transparently to the network equipment 12. The wireless device 14 may configure the tracking process 26 based on configuration signaling received from the network equipment 12 in response to the report 20, e.g., a setup signal or message indicating the identity of the tracking process 26, which may be assigned by the network equipment 12. Regardless, the method 200 may further comprise, based on receiving a reference signal 24 identified as being a reference signal to be tracked by the tracking process 26, tracking the reference signal 24 by tuning (e.g., beamforming of) the receiver configuration 26) (Block 240).

FIG. 7 shows a method 150 performed by network equipment 12 according to one or more additional or alternative embodiments. As shown, the method 150 includes transmitting a reference signal (Block 160). The method 150 further includes, responsive to transmitting the reference signal, receiving a report from a wireless device 14 indicating that the wireless device 14 received the reference signal using one or more logical resources at the wireless device 14 (Block 170). A logical resource in this regard is an abstraction of one or more physical resources that a receiver configuration at the wireless device 14 uses for reception.

FIG. 8 correspondingly shows a method 250 performed by a wireless device 14 according to some embodiments. The method 250 as shown includes receiving a reference signal from network equipment 12 using a receiver configuration (Block 260). This receiver configuration uses one or more physical resources at the wireless device 14. The method 250 also includes transmitting to the network equipment 12 a report indicating that the wireless device 14 received the reference signal using one or more logical resources at the wireless device 14 (Block 270). Again, a logical resource in this regard is an abstraction of one or more physical resources that a receiver configuration at the wireless device 14 uses for reception.

Note that the network equipment 12 (e.g., base station) as described above may perform any of the processing herein by implementing any functional means or units. In one embodiment, for example, the network equipment 12 comprises respective circuits or circuitry configured to perform the steps shown in FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 9:
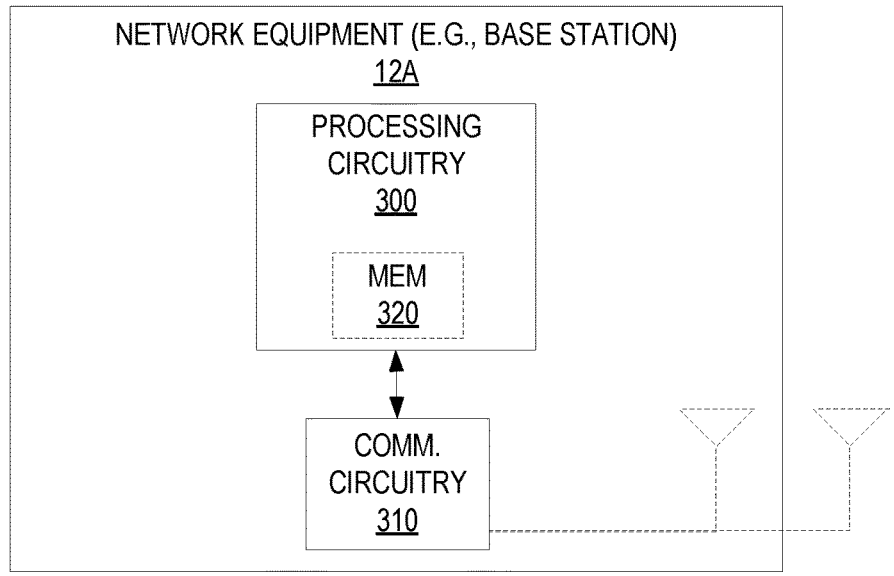
FIG. 9 is a block diagram of network equipment according to some embodiments.

FIG. 9 illustrates a network equipment 12 implemented in the form of a network equipment 12A in accordance with one or more embodiments. As shown, the network equipment 12A includes processing circuitry 300 and communication circuitry 310. The communication circuitry 310 is configured to transmit and/or receive information to and/or from one or more other nodes, e.g., via any communication technology. The communication circuitry 310 may do so for instance via one or more antennas, which may be internal or external to the network equipment 12. The processing circuitry 300 is configured to perform processing described above, e.g., in FIGS. 5 and/or 7, such as by executing instructions stored in memory 320. The processing circuitry 300 in this regard may implement certain functional means, units, or modules.

Figure 10A:
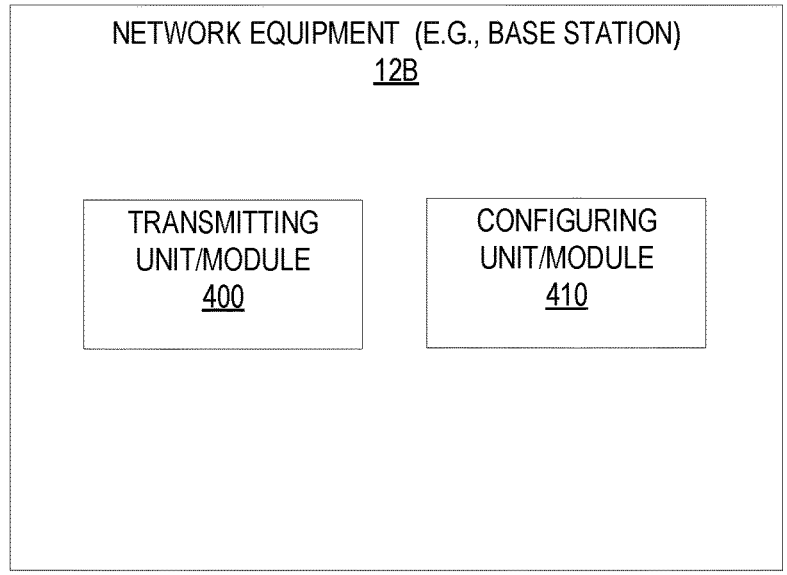
FIG. 10A is a block diagram of network equipment according to other embodiments.

FIG. 10A illustrates a network equipment 12 implemented in the form of a network equipment 12B in accordance with one or more other embodiments. As shown, the network equipment 12B implements various functional means, units, or modules, e.g., via the processing circuitry 300 in FIG. 9 and/or via software code. These functional means, units, or modules, e.g., for implementing the method in FIG. 5, include for instance a transmitting unit or module 400 for transmitting a tracking process base signal to a wireless device. Also included is a configuring unit or module 410 for, responsive to the wireless device receiving a report from the wireless device indicating reception of the tracking process base signal, configuring the wireless device with a tracking process for the wireless device to track a reference signal by tuning a receiver configuration with which the wireless device received the tracking process base signal. The wireless device 14 may for instance track the reference signal 24 autonomously and transparently to the network equipment 12. Moreover, the transmitting unit or module 400 is for transmitting a reference signal to the wireless device and identifying to the wireless device that the reference signal is to be tracked with the configured tracking process.

In some embodiments, the tracking process is for the wireless device to track a reference signal by tuning beamforming used by the receiver configuration.

In some embodiments, the network equipment transmits the tracking process base signal and the reference signal on the same network beam.

In some embodiments, the network equipment configures the wireless device with multiple tracking processes for separately tracking different reference signals by tuning receiver configurations with which the wireless device respectively received different tracking process base signals.

In some embodiments, the network equipment is further configured to select, from among the multiple tracking processes, one or more tracking processes to activate; determine one or more network beams on which one or more reference signals respectively tracked by the one or more activated tracking processes are transmitted; and transmit to the wireless device or receiving from the wireless device control data or user data on the one or more determined network beams.

Alternatively or additionally, in some embodiments, a tracking process base signal is a reference signal that is periodically transmitted on the same network-beam In one or more embodiments, a tracking process base signal is a reference signal. In this case, the network equipment may transmit the tracking process base signal as the reference signal to be tracked.

In some embodiments, the reference signal to be tracked is a dynamically scheduled reference signal. In one or more of these embodiments, the network equipment may identify that the reference signal is to be tracked with the configured tracking process by transmitting to the wireless device an identifier of the configured tracking process in a scheduling message to the wireless device indicating scheduling of the reference signal.

In any of these embodiments, the network equipment is further configured to switch the tracking process between a first mode and a second mode. In the first mode, the tracking process tracks the tracking process base signal in the form of a periodically transmitted reference signal, and in the second mode the tracking process tracks a dynamically scheduled reference signal.

In some embodiments, the network equipment identifies that the reference signal is to be tracked with the configured tracking process by transmitting to the wireless device an identifier of the configured tracking process and an identifier of the reference signal to be tracked by the configured tracking process.

Figure 10B:
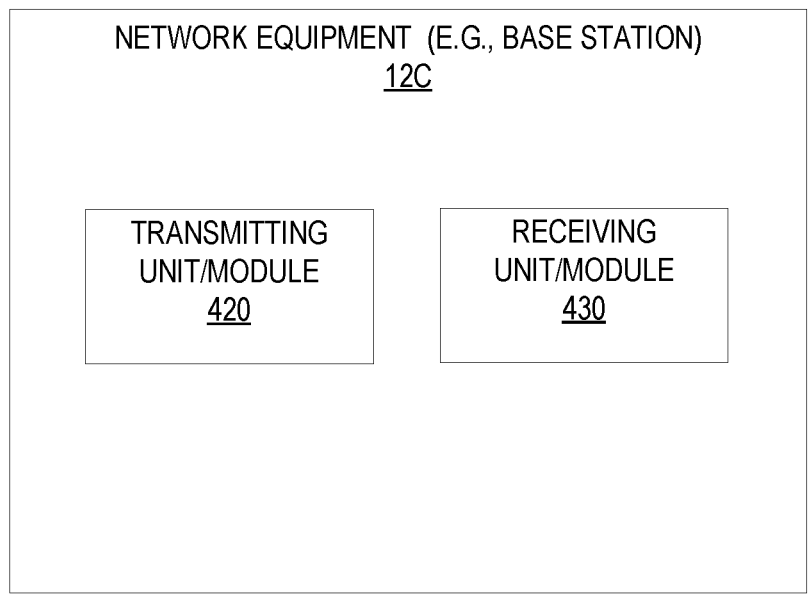
FIG. 10B is a block diagram of network equipment according to still other embodiments.

FIG. 10B illustrates a network equipment 12 implemented in the form of a network equipment 12C in accordance with yet one or more other embodiments. As shown, the network equipment 12C implements various functional means, units, or modules, e.g., via the processing circuitry 300 in FIG. 9 and/or via software code. These functional means, units, or modules include for instance a transmitting unit or module 420 for transmitting a reference signal. Also included is a receiving unit or module 430 for, responsive to the transmitting of the reference signal, receiving a report from a wireless device 14 indicating that the wireless device 14 received the reference signal using one or more logical resources at the wireless device 14. A logical resource in this regard is an abstraction of one or more physical resources that a receiver configuration at the wireless device 14 uses for reception.

In some embodiments, the one or more physical resources are one or more antenna arrays, beam formers, or digital processing chains that the receiver configuration at the wireless device uses for reception.

In some embodiments, the report indicates whether the reference signal is receivable by the wireless device simultaneously with another reference signal by indicating whether the wireless device received the reference signal using the same one or more logical resources as the one or more logical resources usable to receive the another reference signal.

In some embodiments, the reference signal is a tracking process base signal, and the network equipment is further configured to, responsive to receiving the report, configure the wireless device with a tracking process for the wireless device to track a reference signal by tuning a receiver configuration with which the wireless device received the tracking process base signal.

Alternatively or additionally, in some embodiments, the network equipment is further configured to transmit multiple tracking process base signals to the wireless device; responsive to receiving reports from the wireless device indicating reception of the tracking process base signals respectively using one or more logical resources at the wireless device, configure the wireless device with multiple tracking processes for separately tracking different reference signals by tuning receiver configurations with which the wireless device respectively received the tracking process base signals; select for simultaneous activation, from among the multiple tracking processes, multiple tracking processes that do not use any of the same logical resources; determine network beams on which reference signals respectively tracked by the selected tracking processes are transmitted; and transmit to the wireless device or receiving from the wireless device control data or user data on the determined network beams simultaneously.

Similarly, a wireless device 14 as described above may perform any of the processing herein by implementing any functional means or units. In one embodiment, for example, the wireless device 14 comprises respective circuits or circuitry configured to perform the steps shown in FIGS. 6 and/or 8. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 11:
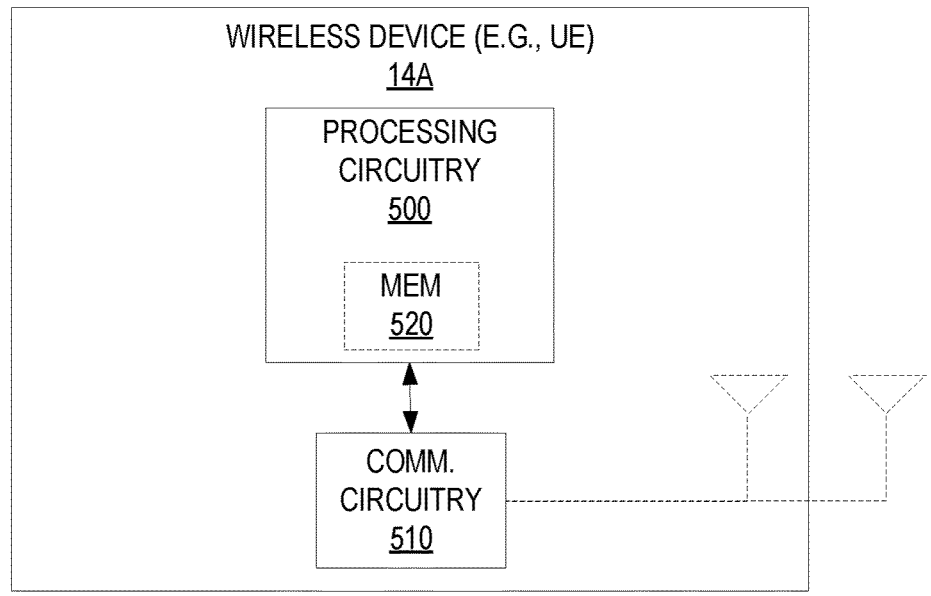
FIG. 11 is a block diagram of a wireless device according to some embodiments.

FIG. 11 illustrates a wireless device 14 implemented in the form of a wireless device 14A in accordance with one or more embodiments. As shown, the wireless device 14A includes processing circuitry 500 and communication circuitry 510. The communication circuitry 510 is configured to transmit and/or receive information to and/or from one or more other nodes, e.g., via any communication technology. The processing circuitry 500 is configured to perform processing described above, e.g., in FIGS. 6 and/or 8, such as by executing instructions stored in memory 520. The processing circuitry 500 in this regard may implement certain functional means, units, or modules.

Figure 12A:
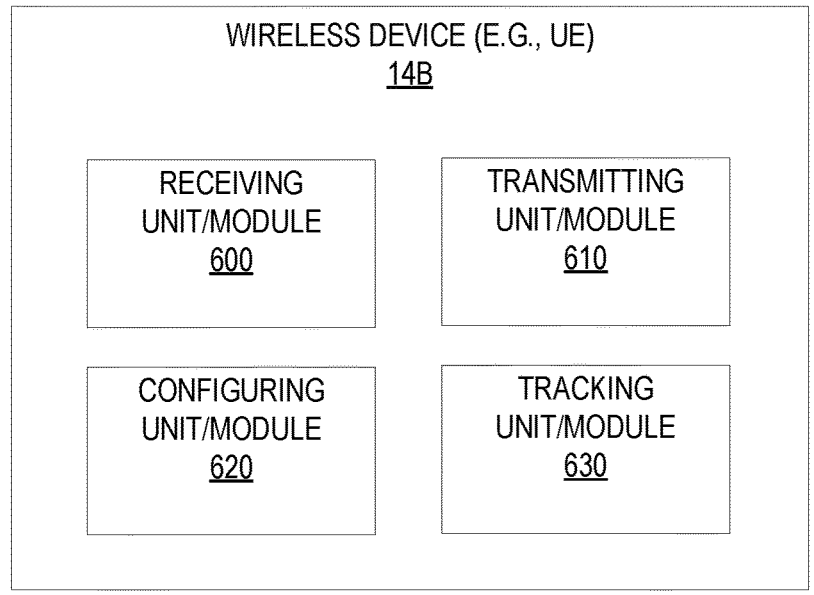
FIG. 12A is a block diagram of a wireless device according to other embodiments.

FIG. 12A illustrates a wireless device 14 implemented in the form of a wireless device 14B in accordance with one or more other embodiments. As shown, the wireless device 14B implements various functional means, units, or modules, e.g., via the processing circuitry 500 in FIG. 11 and/or via software code. These functional means, units, or modules, e.g., for implementing the method in FIG. 6, include for instance a receiving unit or module 600 for receiving, from network equipment 12, a tracking process base signal using a receiver configuration with tunable beamforming. Also included is a transmitting unit or module 610 for transmitting a report to the network equipment 12 indicating reception of the tracking process base signal. Further included is a configuring unit or module 620 for, responsive to the wireless device 14 transmitting the report, configuring the wireless device 14 with a tracking process for the wireless device 14 to track a reference signal by tuning the receiver configuration with which the wireless device received the tracking process base signal. The wireless device 14 may for instance track the reference signal 24 autonomously and transparently to the network equipment 12. Also included is a tracking unit or module 630 for, based on the wireless device receiving a reference signal identified as being a reference signal to be tracked by the tracking process, tracking the reference signal by tuning beamforming of the receiver configuration.

In some embodiments, the wireless device is further configured to configure the wireless device with multiple tracking processes for the wireless device to track different reference signals by tuning the respective receiver configurations with which the wireless device received different tracking process base signals. In this case, the wireless device may be further configured to receive one or more activation messages instructing the wireless device to activate one or more of the multiple tracking processes; determine one or more device beams on which one or more reference signals tracked by the one or more activated tracking processes are received; and transmit to the network equipment or receiving from the network equipment control data or user data on the determined one or more device beams.

In any of the above embodiments, a tracking process base signal is a reference signal that is periodically transmitted on the same network-beam.

In some embodiments, the reference signal tracked by the tracking process is the tracking process base signal. In other embodiments, the reference signal tracked by the tracking process is a dynamically scheduled reference signal. In this case, the wireless device may be further configured to receive an identifier of the tracking process in a scheduling message to the wireless device indicating scheduling of the reference signal.

Alternatively or additionally, in some embodiments, the wireless device is further configured to switch the tracking process between a first mode and a second mode. In the first mode the tracking process tracks the tracking process base signal in the form of a periodically transmitted reference signal, and in the second mode the tracking process tracks a dynamically scheduled reference signal In some embodiments, the wireless device is further configured to receive from the network equipment an identifier of the tracking process and an identifier of the reference signal to be tracked by the tracking process.

Figure 12B:
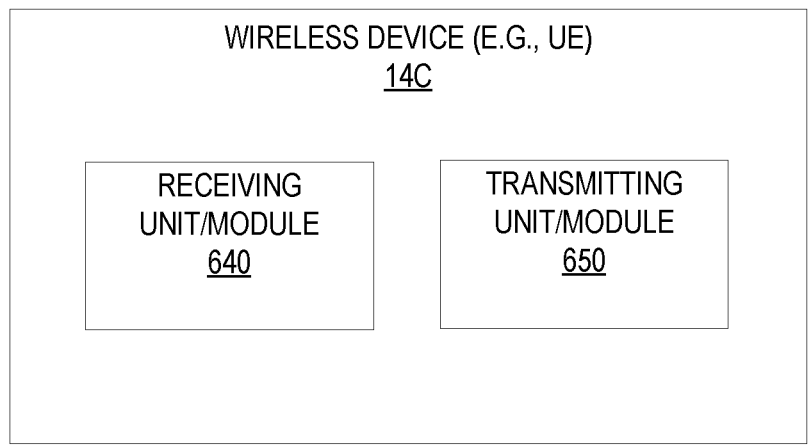
FIG. 12B is a block diagram of a wireless device according to still other embodiments.

FIG. 12B illustrates a wireless device 14 implemented in the form of a wireless device 14C in accordance with yet one or more other embodiments. As shown, the wireless device 14C implements various functional means, units, or modules, e.g., via the processing circuitry 500 in FIG. 11 and/or via software code. These functional means, units, or modules, e.g., for implementing the method in FIG. 8, include for instance a receiving unit or module 640 for receiving a reference signal from network equipment 12 using a receiver configuration. The receiver configuration uses one or more physical resources at the wireless device 14C. Also included is a transmitting unit or module 650 for transmitting to the network equipment 12 a report indicating that the wireless device 14C received the reference signal using one or more logical resources at the wireless device 14C. The one or more logical resources are an abstraction of the one or more physical resources that the receiver configuration uses.

In some embodiments, the one or more physical resources are one or more antenna arrays, beam formers, or digital processing chains that the receiver configuration at the wireless device uses for reception.

In any of the above embodiments, the report may indicate whether the reference signal is receivable by the wireless device simultaneously with another reference signal by indicating whether the wireless device received the reference signal using the same one or more logical resources as the one or more logical resources usable to receive the another reference signal.

In some embodiments, the reference signal is a tracking process base signal, and the wireless device is also configured to, responsive to transmitting the report, configure the wireless device with a tracking process for the wireless device to track a reference signal by tuning the receiver configuration with which the wireless device received the tracking process base signal.

Alternatively or additionally, in some embodiments, the wireless device is also configured to receive, from the network equipment, multiple tracking process base signals using different receiver configurations, each with tunable beamforming; transmit reports to the network equipment indicating reception of the tracking process base signals respectively using one or more logical resources at the wireless device; responsive to transmitting the reports, configure the wireless device with multiple tracking processes for the wireless device to track different reference signals by tuning the respective receiver configurations with which the wireless device received the tracking process base signals; receive one or more activation messages instructing the wireless device to activate multiple ones of the tracking processes that do not use any of the same logical resources; determine device beams on which reference signals tracked by the activated tracking processes are received; and transmit to the network equipment or receiving from the network equipment control data or user data on the determined device beams simultaneously.

Those skilled in the art will also appreciate that embodiments herein further include corresponding computer programs.

A computer program comprises instructions which, when executed on at least one processor of a network equipment 12 or wireless device 14, cause the network equipment 12 or wireless device 14 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a network equipment or wireless device, cause the network equipment or wireless device to perform as described above.

Embodiments further include a computer program product comprising program code portions for performing the steps of any of the embodiments herein when the computer program product is executed by a network equipment or wireless device. This computer program product may be stored on a computer readable recording medium.

Additional embodiments will now be described in a context involving BRS and BRRS, and where the wireless device 14 is referred to as a user equipment, UE. In particular, according to some embodiments the UE scans for BRS transmissions and reports sufficiently strong detected BRS. Based on detected BRS reports, the network defines one or more tracking processes. Beam measurements, reporting, and updates are performed independently per tracking process. A tracking process is either active or monitored. An active tracking process is used for transmission and reception of control data. A monitored tracking process is only tracked; it can later be made active. A UE may support two simultaneous active tracking processes. In some embodiments, at tracking process is defined or initialized based on a detected BRS report. Internal to the UE, a tracking process may correspond to one UE beam on one particular antenna resource.

When sending a detected BRS report, the UE in some embodiments indicates which "logical resources" would be required by a corresponding tracking process. For instance, logical resources may correspond to antenna arrays, beam formers, or digital processing chains. In one embodiment, the UE indicates this using a bitmap, with a 1 for each required logical resource. If two tracking processes have overlapping bitmaps, they are considered incompatible and may not be used simultaneously. Tracking processes using non-overlapping logical resources are compatible, i.e., can be active simultaneously.

In some embodiments, a tracking process to the network is a UE receiver configuration tuned to receive certain downlink reference signals. The network in some embodiments does not know the UE settings of this receiver configuration (e.g., if a certain UE beam was used or not), but the network knows which reference signals are suitable for the UE to tune it. It is however up to the UE if and how the tuning is actually performed. What the network does know about the receiver configuration is which logical resources it uses. These logical resources are defined by the UE as an abstraction of the physical resources it used for the receiver configuration. The network can obtain the logical resource and other information about a tracking process (E.g., signal strength and channel quality) through measurement reports on downlink reference signals.

To the UE, a tracking process is a receiver configuration meaning a particular set of beamforming weight(s) applied to a particular set of physical antenna resources. The UE may assume that the network antenna ports used for tuning, data transmissions, and data receptions are quasi-co-located. The UE does normally not know which BRS (or network-beam) the network will use in conjunction with a tracking process; only when a tracking process is in BRS mode can the UE assume that a certain BRS is associated with it. Which beamforming weights the UE uses in a certain tracking process will change over time, but the logical resources used by a tracking process remains the same.

Note, though, that if there is reciprocity between DL and UL. Using a tracking process in the UL implies that the UE may apply the transmitter configuration corresponding to the receiver configuration associated with the tracking process, e.g., the same beamforming weights on the same antenna hardware.

Figure 13:
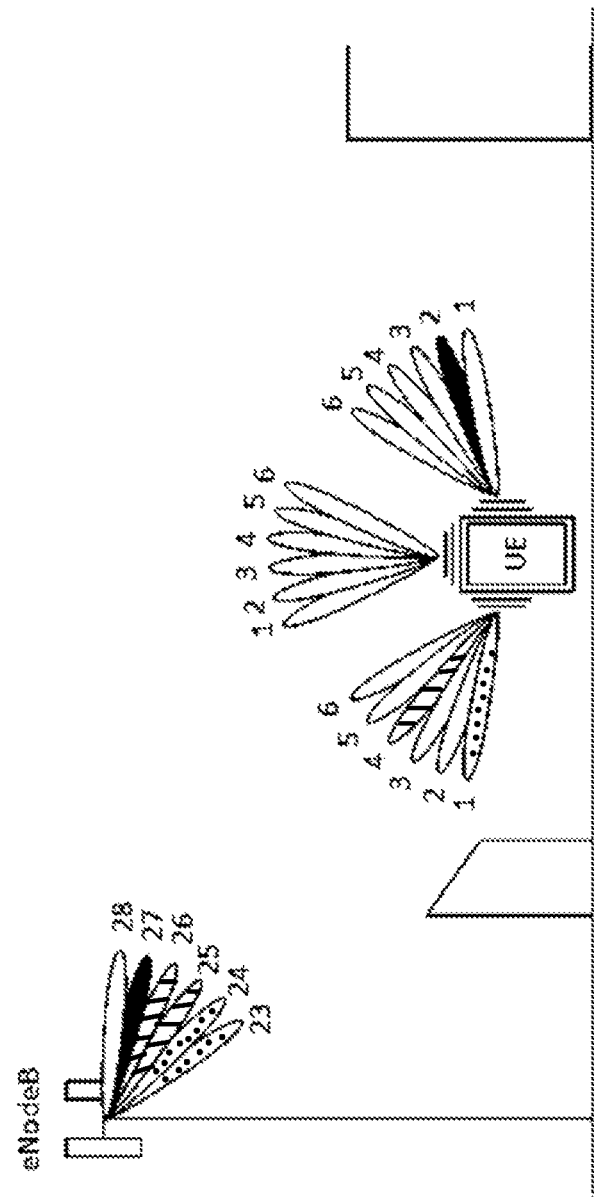
FIG. 13 is a block diagram of an example where a UE indicates in a BRS report different logical resources with which BRS are received from an eNodeB.

FIG. 13 illustrates a simple example where bitmaps indicate logical resources with which BRS were received, where the logical resources correspond to antenna panels at the UE. As shown, the UE receives BRS 23 and 24 using UE beam 1 on antenna panel 1, receives BRS 25 and 26 using UE beam 4 on antenna panel 1, and receives BRS 27 using UE beam 2 on antenna panel 3. In response, the UE sends three dedicated BRS reports. With a first report, the UE reports receipt of BRS 23 and 24 along with the bitmap "100" indicating that the BRS were received using antenna panel 1. With a second report, the UE reports receipt of BRS 25 and 26 along with the bitmap "100" indicating that the BRS were received using antenna panel 1. And with a third report, the UE reports receipt of BRS 27 along with the bitmap "001" indicating that the BRS was received using antenna panel 3.

Figure 14:
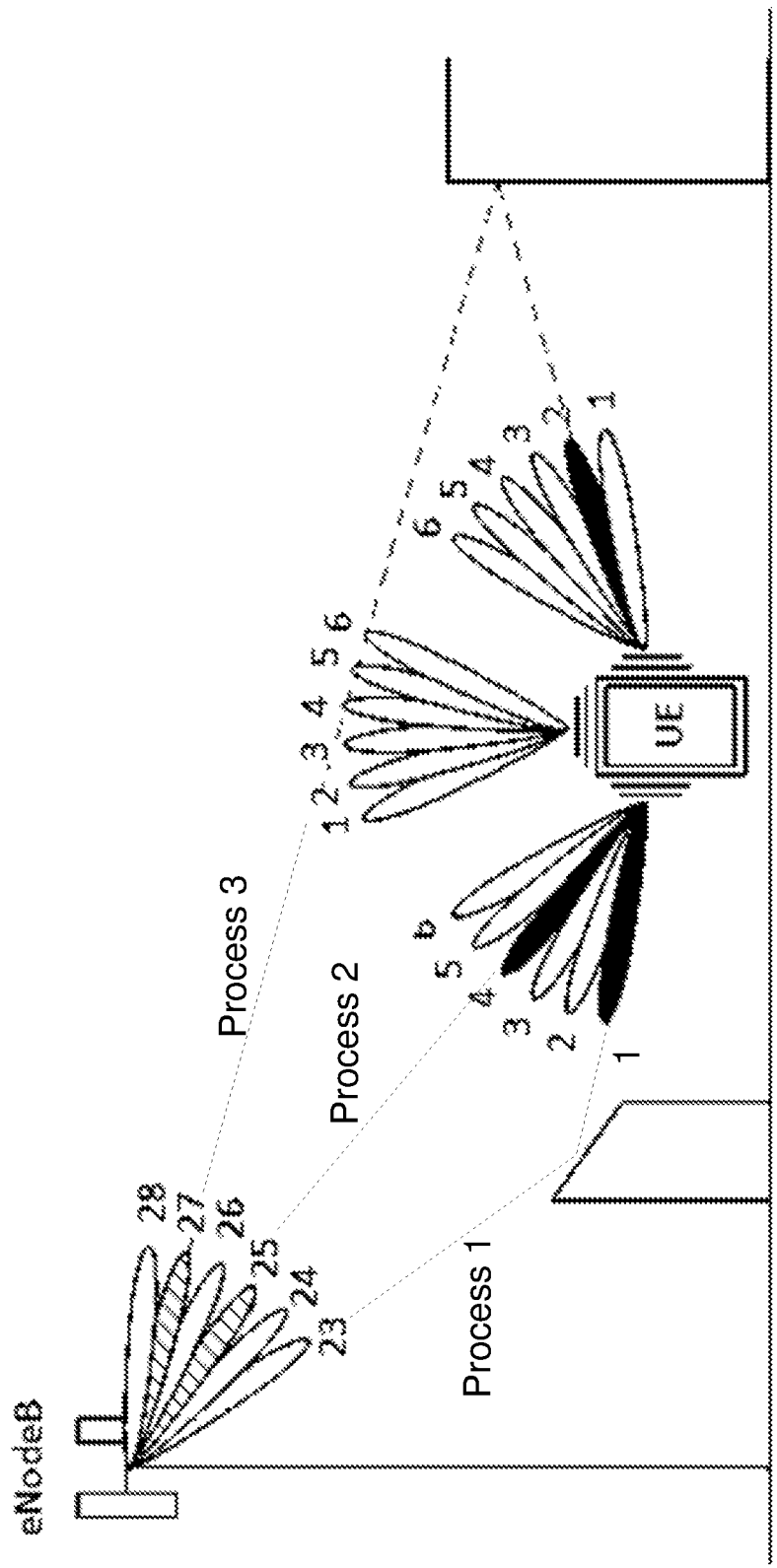
FIG. 14 is a block diagram of an example where tracking processes are defined based on the UE reporting in FIG. 13.

FIG. 14 continues the example of FIG. 13 for illustrating the tracking processes defined based on the UE's reporting. As shown, the network defines three monitored tracking process. The network in this regard signals to the UE that tracking process 1 is based on the first report, tracking process 2 is based on the second report, and tracking process 3 is based on the third report. Note from the reported bitmaps in the example of FIG. 13, however, that tracking processes 1 and 2 are incompatible. Tracking process 3 is compatible with either process 1 or process 2.

One or two tracking processes are configured as active. It is optional for a to support two active tracking processes. Active tracking processes are used for control and data reception and transmission. For xPDCCH/xPDSCH the UE always uses all configured active tracking processes. For xPUCCH/xPUSCH transmission, which of the configured active tracking process to use is indicated in downlink control information (DCI) (can be extended to precoding over multiple active tracking processes). Only two compatible tracking processes may be simultaneously active. Active tracking processes may be defined using fast layer 2 (L2) signaling from the network to the UE such as medium access control (MAC) control elements (CE).

Figure 15:
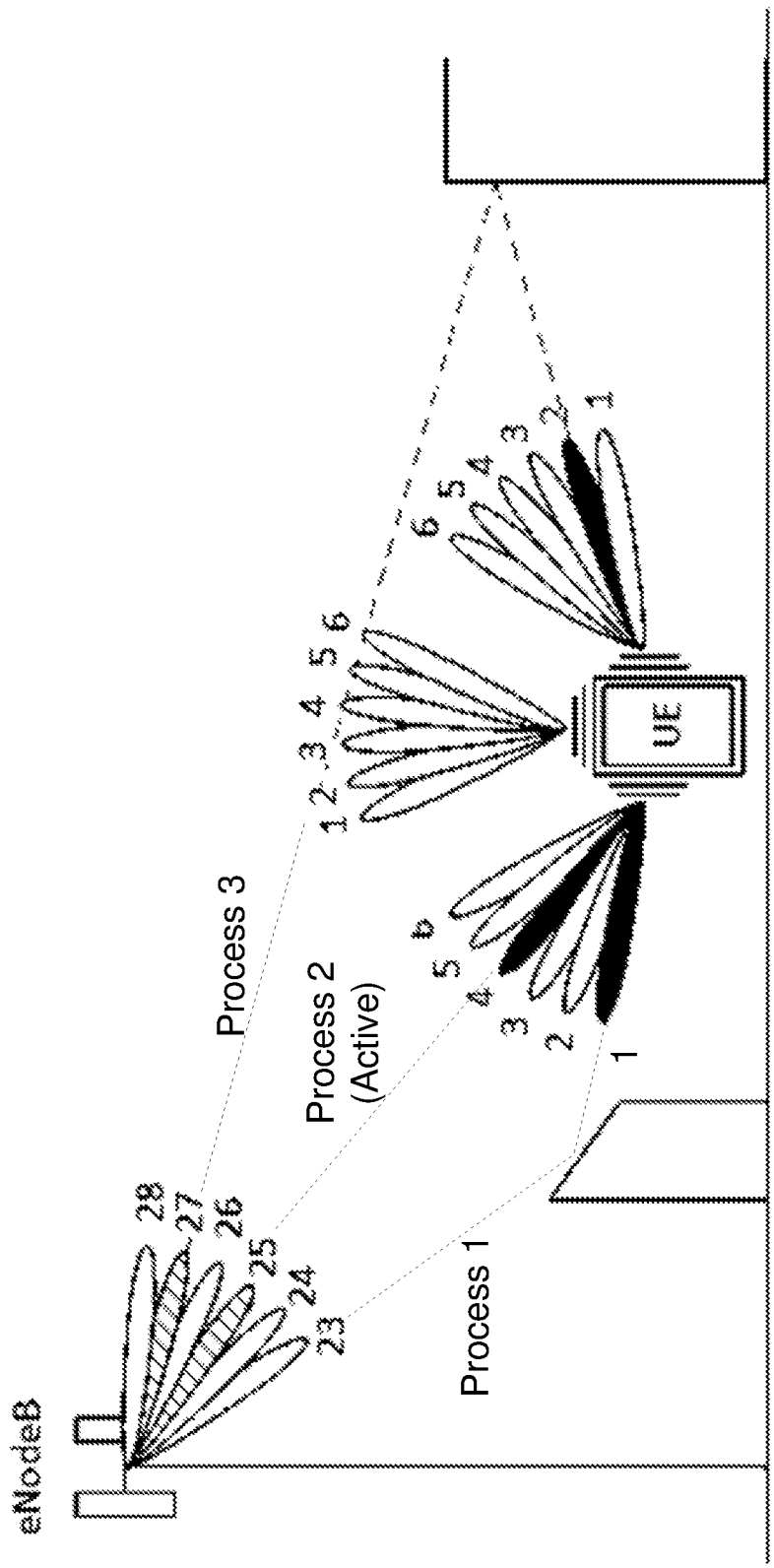
FIG. 15 is a block diagram of an example where a particular tracking process is activated based on the UE reporting in FIG. 13.

Continuing the example of FIGS. 13 and 14 in this regard, FIG. 15 shows that the network defines tracking process 2 as the only active tracking process. Tracking process 2 is therefore used by the UE for transmission and reception of control and data. All three defined tracking processes however are continuously tracked using measurements and reporting.

Accordingly, each tracking process can be in one of two modes for UE beam tracking. In BRS tracking mode, the UE beam is optimized for a particular BRS. Which BRS to optimize for is signaled by the network. In BRRS tracking mode, the UE beam is optimized using BRRS. Initially, a tracking process is in BRS tracking mode. BRRS tracking mode is entered when BRRS is received for a tracking process. BRS tracking mode is entered either by receiving a BRS tracking message, or when a certain time has passed without receiving BRRS for that tracking process.

In terms of the maintenance of tracking processes, BRRS is used to update a UE beam. In some embodiments, there may be one or more tracking processes per Orthogonal Frequency Division Multiplexing (OFDM) symbol. Tracking processes and BRRS antenna ports (APs) may be indicated in downlink control information (DCI). CSI-RS may be used to evaluate the quality of one, or a combination of two, tracking processes. If two tracking processes are evaluated, the UE reports CSI for the combination of those. Tracking processes and CSI-RS APs may be indicated in the DCI. The network can request BRS measurements on a tracking process in order to update the network beam used.

Figure 16:
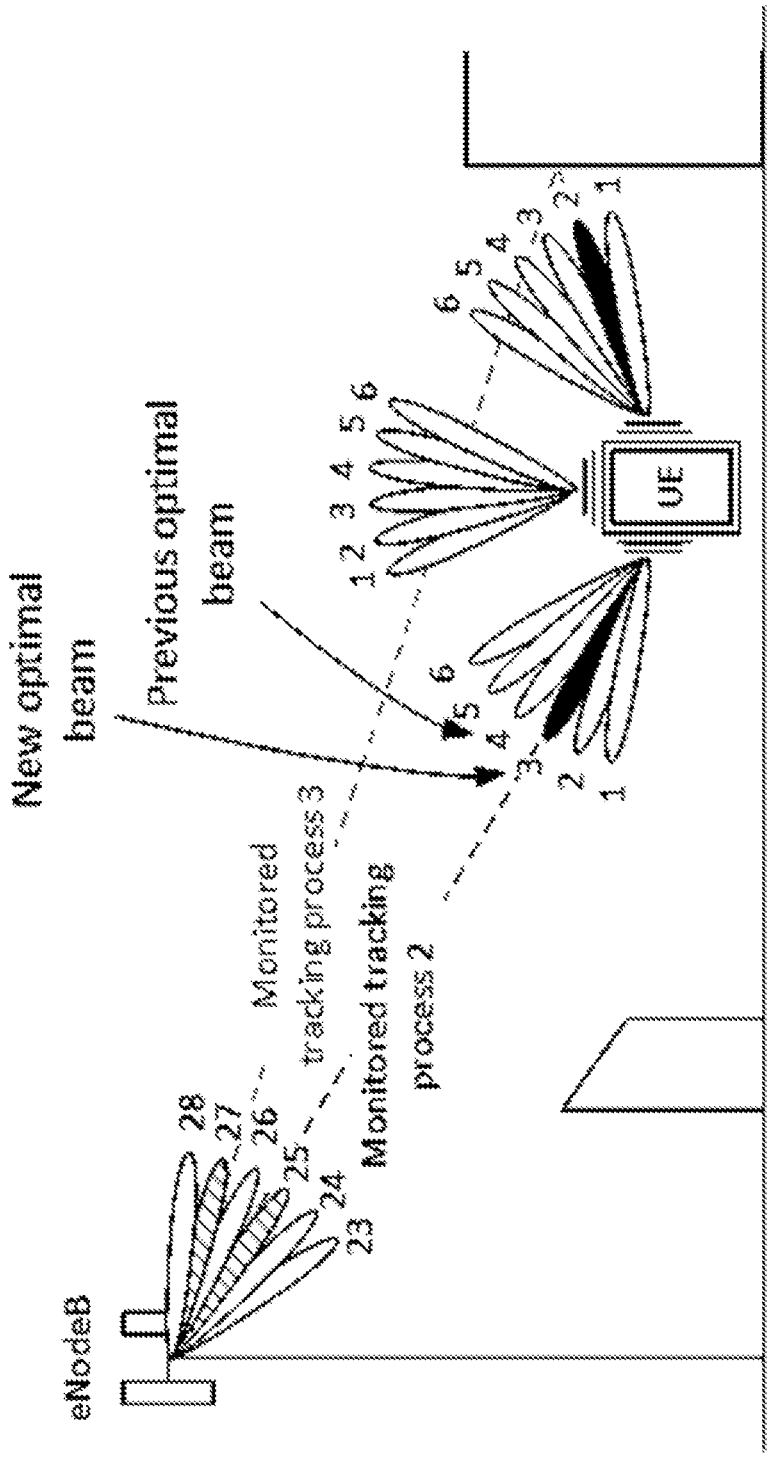
FIG. 16 is a block diagram of an example for maintaining tracking processes using BRRS according to some embodiments.

Consider BRRS-based maintenance in the context of the running example. As shown in FIG. 16, the UE has moved. The network schedules the UE for BRRS on tracking processes 2 and 3, and transmits BRRS on network beam 25 (first symbol) and network beam 27 (second symbol). For tracking process 2, the UE finds a new optimal beam (3 instead of 4), which it uses for this process from now on. For tracking process 3, the optimal UE beam is the same as before.

Figure 17:
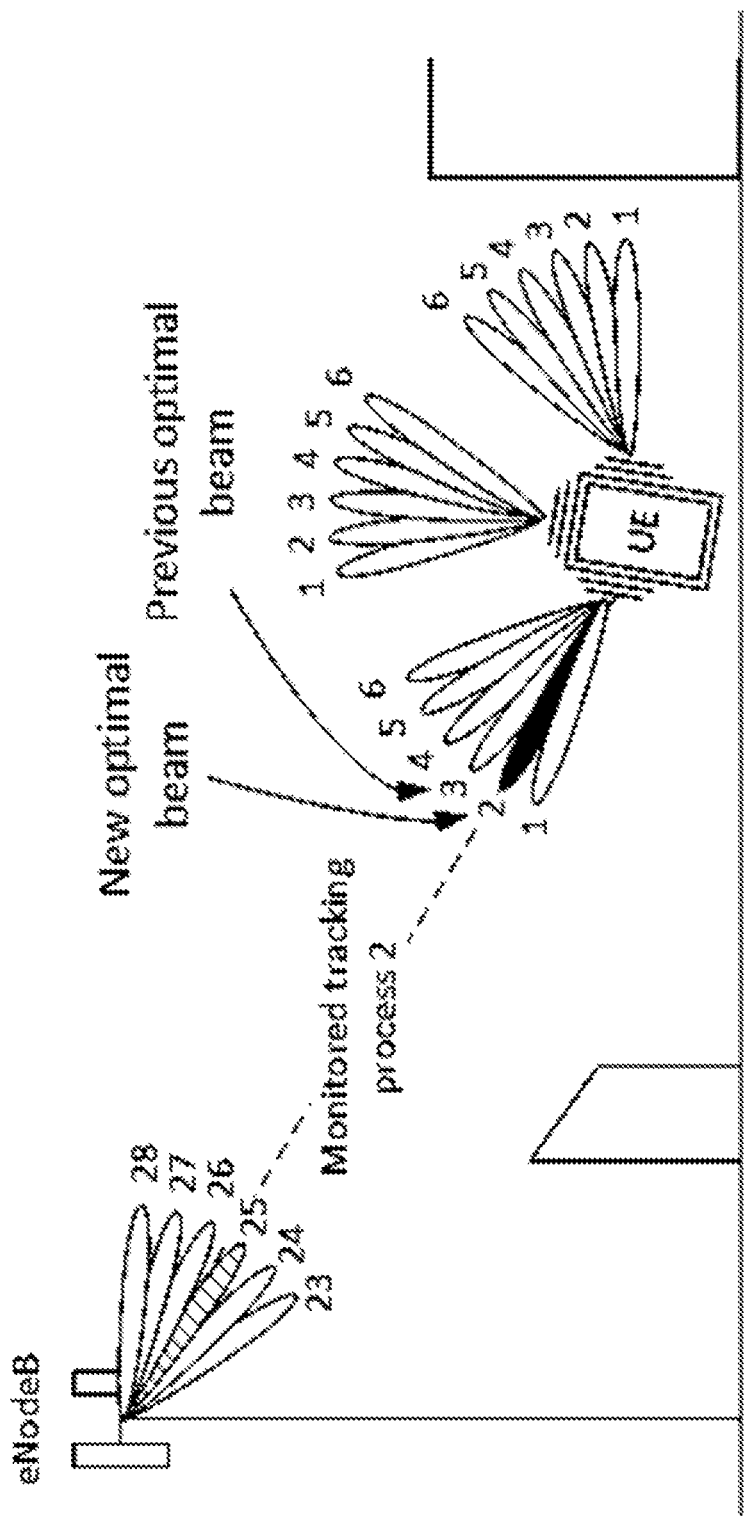
FIG. 17 is a block diagram of an example for maintaining tracking processes using BRS according to some embodiments.

Now consider tracking process maintenance using BRS. As shown in FIG. 17, the UE has rotated. The network ceases with BRRS scheduling for tracking process 2, and instructs the UE to go into BRS tracking mode, using BRS 25. The UE measures BRS 25 using different UE beams on tracking process 2, and updates it to use UE beam 2 instead of 3.

In some embodiments, there are two kinds of BRS-RP measurements. A first kind includes network-requested BRS-RP measurements on a tracking process. These measurements are requested by the network using fast layer 2 (L2) signaling, indicating which tracking process to use BRS measurements made during one sweeping period on a UE beam used by the indicated process. The UE reports all BRSs (up to N) that are within M dB of the strongest BRS. The UE sends the BRS measurement report using fast L2 signaling.

A second kind includes UE-initiated BRS-RP measurements on detected ("sufficiently strong") UE beams. The UE continuously scans using UE beams not used by any tracking process. The UE does so in order to find new network beams and/or to find new and possibly better UE beams for already known network beams. A detected BRS report is sent using fast L2 signaling. These reports form the basis for defining new tracking processes.

In terms of initial connection setup, such setup involves beam search and synchronization as well as random access. In random access message 3, the UE includes one detected BRS report. In random access message 4, the network defines the first tracking process, which automatically is set to active. Normal beam management then continues.

Some UE-initiated reporting embodiments propose that the UE keeps a list of recent BRS received port (BRS-RP) measurements and reports. The in this regard finds a BRS-RP measurement (on some BRS, UE panel and UE beam) that: (1) is not weaker than $\Delta_{all}$ below the strongest overall BRS (for any BRS, UE panel, and UE beam); (2) is stronger than any other recently measured UE beam for its BRS and UE panel; (3) is stronger by a margin $\Delta_{same}$ than any recent reports for the same BRS on its UE panel; and/or (4) is the strongest measurement that fulfills the above requirements. If such a measurement is found, the UE creates a detected BRS report for its UE panel and UE beam. In the report the UE includes the strongest $N_{report}$ measured BRS-RP values on that UE panel and UE beam. The UE sends the beam report only if the fulfilling BRS is included among the included BRS-RP values. The detected BRS report is sent as fast L2 signaling.

Figure 18:
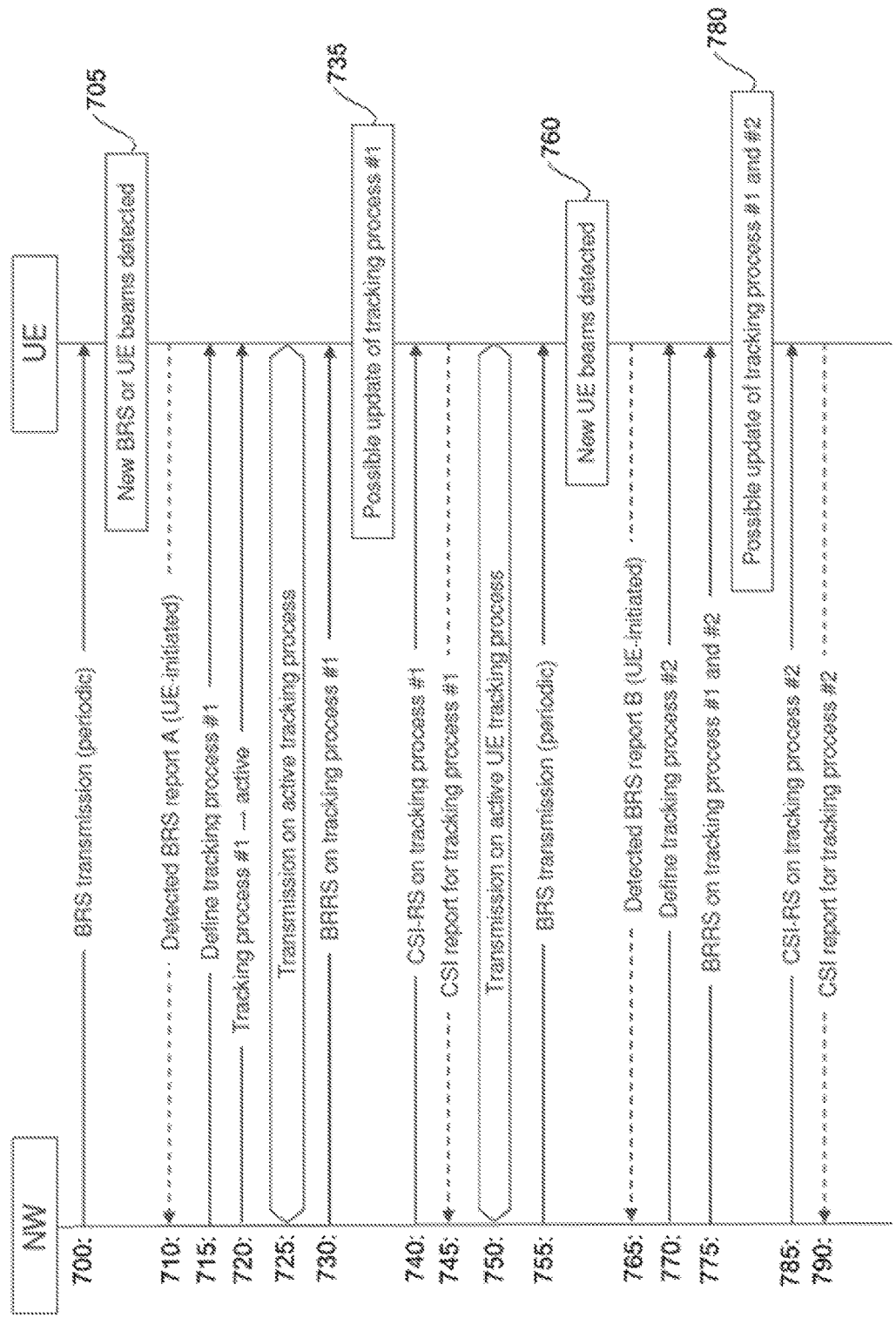
FIG. 18 is a call flow diagram for defining and maintaining tracking processes according to some embodiments.

Consider now the beam management example shown in FIG. 18. As shown, the network periodically transmits a BRS (Step 700). The UE detects the BRS as being a new BRS, or detects a new UE beam for receiving that BRS (Step 705).

The UE may optionally transmit UE-initiated detected BRS report A to the network (Step 710). The UE creates the detected BRS report based on certain criteria in order to report new or unused propagation paths, e.g., by reporting strong BRS that are currently not part of a tracking process and have not recently been reported. The report contents may include a report identity, an indication of logical resources used in the measurement that will also be used in a corresponding tracking process, a number of antenna ports, and/or a list of BRS identity, BRS-RP in dBm. This report constitutes the basis for tracking process setup by the network. Indeed, in response to that report, the network defines tracking process #1 and configures the UE with that new tracking process (Step 715). The tracking process setup message to the UE may therefore configure the UE with one monitored tracking process, to enable UE beam tracking and reporting (initially using BRS tracking). The UE shall continuously update its beamforming for the monitored tracking process. The tracking process setup message's contents may include a tracking process identity, a detected BRS report identity based on which the tracking process is setup, and a BRS identity to use for initial BRS tracking. Although not shown in FIG. 18, the UE may return a message to the network confirming that the UE has received and set up a tracking process. The "tracking process complete" message may include as its contents a tracking process identity.

After or as part of tracking process setup, the network actives that tracking process #1 (Step 720) (e.g., in order to change which tracking processes are active or monitored). The tracking process activation message may have as its contents an identity of a first active tracking process, and optionally an identity of a second active tracking process. A special value may be used for either or both tracking processes to indicate an unused state of that process. The logical resources and UE beams associated with the tracking process will be used in reception and transmission of control and data. Indeed, with tracking process #1 activated, the network performs transmission (of user data and/or control data) on that active tracking process (Step 725). The network then configures BRRS on tracking process #1 (Step 730) as part of maintaining tracking process #1. The UE may then possibly update tracking process #1 based on the BRRS (Step 735). The network furthermore transmits CSI-RS on tracking process #1 (Step 740), and the UE may correspondingly transmit a CSI report for tracking process #1 (Step 745). The network may again perform transmission on the active tracking process as possibly updated (Step 750).

Thereafter, the network may again transmit BRS (Step 755), based on which the UE may detect new UE beams for receiving that BRS (Step 760) and transmit a UE-initiated detected BRS report B to the network (Step 765). Based on that report B, the network may define and configure tracking process #2 (Step 770). When the network transmits BRRS on tracking processes #1 and #2 (Step 775), the UE may update those tracking processes (Step 780) in a way similar to that described above. Similarly, the network may transmits CSI-RS on tracking process #2 (Step 785) and the UE may transmit a CSI report for tracking process #2 in response (Step 790).

Although not shown, the network may release a tracking process with a release message to the UE that remove one of the tracking processes from the UE, thus requesting the UE to stop beam tracking for no longer useful propagation paths. This release message may include a tracking process identity to be released.

Also, the network may transmit a BRS tracking message to the UE to enable BRS tracking mode for a tracking process and set its associated BRS. The message may include a tracking process identity and a BRS identity. In BRS tracking mode, the network may transmit a BRS measurement request to the UE to initiate BRS measurement on a tracking process. The UE shall measure and report all known BRS using the indicating tracking process. A single report is sent after all the measurements are complete. The measurement request message may include a tracking process identity, a maximum number of BRS to report, and a relative reporting margin in dB. The measurement report message may include a tracking process identity and a list of (BRS identity and BRS-RP in dBm).

Accordingly, embodiments include configuration of BRS tracking mode or BRRS tracking mode. A message may configure the UE to be in an autonomous tracking mode (based on periodic downlink reference signals) or in a non-autonomous tracking mode (based on scheduled reference signals). A timer may tell the UE when it should fall back to autonomous tracking mode.

Consider now an example where the UE detects that using a certain Rx configuration, it can receive BRS23, BRS24 and BRS25 well enough and transmits this information back to the network (NW). Based on this, the NW transmits a "tracking process setup" message to the UE informing it that the Rx configuration it used will from now on be referred to as "tracking process 01" and that BRS25 is associated with it. Until the UE is told otherwise by the NW, it may, whenever BRS25 is transmitted (it knows the periodic pattern), measure the received power of it and if it finds an Rx configuration better than the one currently associated with tracking process 01, update the associated Rx settings accordingly.

Now let the NW transmit a BRRS grant for tracking process 01 to the UE. This instructs the UE to: (a) go into BRRS tracking mode, which means that the UE is no longer permitted to update the receive configuration of this tracking process based on measurements of BRS25; in fact, the UE shouldn't even associate BRS25 with this tracking process anymore; and (b) measure the signal strength of the (upcoming) BRRS signal (the BRRS grant comes some ~100 us before) that is transmitted, and do so using different Rx configurations. If it finds an Rx configuration that is better than the one currently associated with tracking process 01, it shall update the associated Rx settings accordingly. For the transmission of the BRRS signal, the NW will know of no NW beam better suited for this tracking process than the NW beam used with BRS25, which is therefore the NW beam it will use.

Now let the NW send a "BRS measurement request" for tracking process 01 to the UE. The UE will measure the signal strength of each BRS using the associated Rx configuration and send the result (only the "N" strongest) back to the NW. Based on this report, the NW concludes that a BRS other than BRS25 is better suited, say BRS24.

Now let the NW transmit another BRRS grant for tracking process 01 to the UE. The UE is already in BRRS mode, but will as before measure the signal strength of the BRRS signal that is transmitted using different Rx configurations, and if it finds one that is better than the one currently associated with tracking process 01, it will update the associated Rx settings accordingly. The NW, however, will this time transmit on another NW beam than last time, namely the NW beam used with BRS24 rather than the one used with BRS25.

Some embodiments may consider it to be a problem if the UE continued to associate BRS25 with tracking process 01. In these embodiments, since the optimal configuration for receiving BRS25 may be different from the one receiving BRS24, the UE cannot be allowed to update the Rx configuration based on measurements on BRS25 now that the NW will be using BRS24 in scheduled transmissions on this tracking process.

In these embodiments, therefore, in BRS mode, the UE knows which BRS that is associated with each tracking process and can thus update the receiver configuration of a process by doing measurements whenever that BRS is (periodically) transmitted. This is in contrast to a tracking process in BRRS mode, with which the UE must not associate any BRS. In practice, when the NW transmits a (scheduled) reference signal (BRRS) that allows the UE to perform this tuning, the UE is unaware which NW beam that is actually used for transmission. The UE simply tries to optimize its receive configuration in order to make the reception of that reference signal as good as possible.

Note that in some embodiments the BRRS is transmitted over the same beam that was used for the tracking in BRS-mode. In other embodiments, though, the BRRS may be transmitted over a different beam than that which was used for the tracking in BRS-mode. In the BRRS tracking mode, for example, the network may change the NW beam based on the uplink measurement performed on a physical uplink shared channel (PUSCH) or sounding reference signal (SRS).

Accordingly, in some embodiments, in BRS tracking mode the UE is tracking a certain BRS, whereas in BRRS tracking mode the UE is tracking the BRRS the NW schedules for the UE.

Note also that in some embodiments, the NW beam is expected to be constantly changing due to motion on the UE side. Declaring a new tracking process in this case whenever there is a better NW beam towards the UE would imply a lot of control signaling overhead in terms of sending (re)configuration messages to the UE. The tracking process herein may have a longer life expectancy than that. A simple use case would be when the strongest tracking process corresponds to the line-of-sight path (i.e., the shortest path) between NW and UE. As the UE moves around, both the NW beam that is directed towards the UE and the UE beam that is directed towards the NW will change over time, but the network may still want to transmit the signal on the line-of-sight path, since that is the strongest path there is. The methods herein may allow for a way to let both UE and NW update its settings (i.e., used beams) while still using same tracking process for transmission.

The invention claimed is:

1. A method performed by network equipment configured for use in a wireless communication system, the method comprising:
   transmitting a reference signal;
   responsive to said transmitting, receiving a report from a wireless device indicating that the wireless device received the reference signal using one or more logical resources at the wireless device, wherein a logical resource is an abstraction of one or more physical resources that a receiver configuration at the wireless device uses for reception;
   transmitting multiple tracking process base signals to the wireless device;
   responsive to receiving reports from the wireless device indicating reception of the tracking process base signals respectively using one or more logical resources at the wireless device, configuring the wireless device with multiple tracking processes for separately tracking different reference signals by tuning receiver configurations with which the wireless device respectively received the tracking process base signals;

selecting for simultaneous activation, from among the multiple tracking processes, multiple tracking processes that do not use any of the same logical resources;

determining network beams on which reference signals respectively tracked by the selected tracking processes are transmitted; and transmitting to the wireless device or receiving from the wireless device control data or user data on the determined network beams simultaneously.

2. The method of claim 1, wherein the one or more physical resources include one or more antenna arrays, beam formers, or digital processing chains that the receiver configuration at the wireless device uses for reception.

3. The method of claim 1, wherein the report indicates whether the reference signal is receivable by the wireless device simultaneously with another reference signal by indicating whether the wireless device received the reference signal using the same one or more logical resources as the one or more logical resources usable to receive the another reference signal.

4. The method of claim 1, wherein the reference signal is a tracking process base signal.

5. A method performed by wireless device configured for use in a wireless communication system, the method comprising:

receiving a reference signal from network equipment using a receiver configuration, wherein the receiver configuration uses one or more physical resources at the wireless device;

transmitting to the network equipment a report indicating that the wireless device received the reference signal using one or more logical resources at the wireless device, wherein the one or more logical resources are an abstraction of the one or more physical resources that the receiver configuration uses;

receiving, from the network equipment, multiple tracking process base signals using different receiver configurations, each with tunable beamforming;

transmitting reports to the network equipment indicating reception of the tracking process base signals respectively using one or more logical resources at the wireless device;

responsive to transmitting the reports, configuring the wireless device with multiple tracking processes for the wireless device to track different reference signals by tuning the respective receiver configurations with which the wireless device received the tracking process base signals;

receiving one or more activation messages instructing the wireless device to activate multiple ones of the tracking processes that do not use any of the same logical resources;

determining device beams on which reference signals tracked by the activated tracking processes are received; and transmitting to the network equipment or receiving from the network equipment control data or user data on the determined device beams simultaneously.

6. The method of claim 5, wherein the one or more physical resources are one or more antenna arrays, beam formers, or digital processing chains that the receiver configuration at the wireless device uses for reception.

7. The method of claim 5, wherein the report indicates whether the reference signal is receivable by the wireless device simultaneously with another reference signal by indicating whether the wireless device received the reference signal using the same one or more logical resources as the one or more logical resources usable to receive the another reference signal.

8. The method of claim 5, wherein the reference signal is a tracking process base signal.

9. Network equipment configured for use in a wireless communication system, the network equipment comprising:

processing circuitry; and memory containing instructions executable by the processing circuitry whereby the network equipment is configured to:

transmit a reference signal;

responsive to transmitting the reference signal, receive a report from a wireless device indicating that the wireless device received the reference signal using one or more logical resources at the wireless device, wherein a logical resource is an abstraction of one or more physical resources that a receiver configuration at the wireless device uses for reception;

transmit multiple tracking process base signals to the wireless device;

responsive to receiving reports from the wireless device indicating reception of the tracking process base signals respectively using one or more logical resources at the wireless device, configure the wireless device with multiple tracking processes for separately tracking different reference signals by tuning receiver configurations with which the wireless device respectively received the tracking process base signals;

select for simultaneous activation, from among the multiple tracking processes, multiple tracking processes that do not use any of the same logical resources;

determine network beams on which reference signals respectively tracked by the selected tracking processes are transmitted; and transmit to the wireless device or receive from the wireless device control data or user data on the determined network beams simultaneously.

10. The network equipment of claim 9, wherein the one or more physical resources include one or more antenna arrays, beam formers, or digital processing chains that the receiver configuration at the wireless device uses for reception.

11. The network equipment of claim 9, wherein the report indicates whether the reference signal is receivable by the wireless device simultaneously with another reference signal by indicating whether the wireless device received the reference signal using the same one or more logical resources as the one or more logical resources usable to receive the another reference signal.

12. The network equipment of claim 9, wherein the reference signal is a tracking process base signal.

13. A wireless device configured for use in a wireless communication system, the wireless device comprising:

processing circuitry; and memory containing instructions executable by the processing circuitry whereby the wireless device is configured to:

receive a reference signal from network equipment using a receiver configuration, wherein the receiver configuration uses one or more physical resources at the wireless device;

transmit to the network equipment a report indicating that the wireless device received the reference signal using one or more logical resources at the wireless device, wherein the one or more logical resources are an abstraction of the one or more physical resources that the receiver configuration uses;

receive, from the network equipment, multiple tracking process base signals using different receiver configurations, each with tunable beamforming;

transmit reports to the network equipment indicating reception of the tracking process base signals respectively using one or more logical resources at the wireless device;

responsive to transmitting the reports, configure the wireless device with multiple tracking processes for the wireless device to track different reference signals by tuning the respective receiver configurations with which the wireless device received the tracking process base signals;

receive one or more activation messages instructing the wireless device to activate multiple ones of the tracking processes that do not use any of the same logical resources;

determine device beams on which reference signals tracked by the activated tracking processes are received; and transmit to the network equipment or receive from the network equipment control data or user data on the determined device beams simultaneously.

14. The wireless device of claim 13, wherein the one or more physical resources are one or more antenna arrays, beam formers, or digital processing chains that the receiver configuration at the wireless device uses for reception.

15. The wireless device of claim 13, wherein the report indicates whether the reference signal is receivable by the wireless device simultaneously with another reference signal by indicating whether the wireless device received the reference signal using the same one or more logical resources as the one or more logical resources usable to receive the another reference signal.

16. The wireless device of claim 13, wherein the reference signal is a tracking process base signal.

* * * * *